United States Patent
Shim et al.

(10) Patent No.: US 10,637,288 B2
(45) Date of Patent: Apr. 28, 2020

(54) OPTIMAL OPERATION AND SCHEDULING BASED ON MICROGRID DEMAND STATES

(71) Applicant: LSIS CO., LTD., Anyang-si, Gyeonggi-do (KR)

(72) Inventors: Jae-Seong Shim, Anyang-si (KR); Myung-Hwan Lee, Anyang-si (KR); Yong-Hark Shin, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 183 days.

(21) Appl. No.: 15/964,960

(22) Filed: Apr. 27, 2018

(65) Prior Publication Data
US 2018/0316222 A1 Nov. 1, 2018

(30) Foreign Application Priority Data
Apr. 28, 2017 (KR) .................. 10-2017-0055314

(51) Int. Cl.
*H02J 13/00* (2006.01)
*H02J 9/06* (2006.01)
(Continued)

(52) U.S. Cl.
CPC ............ *H02J 13/0079* (2013.01); *H02J 3/28* (2013.01); *H02J 9/06* (2013.01); *H02J 9/061* (2013.01); *G05B 15/02* (2013.01)

(58) Field of Classification Search
None
See application file for complete search history.

(56) References Cited

U.S. PATENT DOCUMENTS

| | | | | |
|---|---|---|---|---|
| 6,819,087 B2* | 11/2004 | Delmerico | ................ | H02J 3/24 322/19 |
| 7,983,799 B2* | 7/2011 | Bose | ........................ | H02J 3/06 700/287 |

(Continued)

FOREIGN PATENT DOCUMENTS

| | | |
|---|---|---|
| JP | 2016189691 A | 11/2016 |
| KR | 20150136171 A | 12/2015 |

(Continued)

OTHER PUBLICATIONS

Hall, T. and Fischer, C.H., "Microgrid Enabled Distributed Energy Solutions (MEDES) Fort Bliss Military Reservation", Feb. 2014, ESTCP Project EW-201140. (Year: 2014).*

(Continued)

*Primary Examiner* — Mohammad Ali
*Assistant Examiner* — Kelvin Booker
(74) *Attorney, Agent, or Firm* — K&L Gates, LLP

(57) ABSTRACT

A hierarchical power control system associated with a cloud server includes a first microgrid cell, a second microgrid cell, a third microgrid cell, a middleware server, and an integrated control system. The first microgrid cell includes a first energy storage system (ESS) having an uninterruptible power supply (UPS) structure and a first load having a power state managed by the first energy storage system (ESS). The second microgrid cell includes a second load and a second energy storage system (ESS) for managing a power state of the second load. The third microgrid cell includes a third load. The middleware server communicates with the first to third microgrid cells. The integrated control system receives power supply-demand state information of the first to third microgrid cells through the middleware server, and establishes an integrated operation schedule based on the received (Continued)

power supply-demand state information of the first to third microgrid cells.

14 Claims, 22 Drawing Sheets

(51) Int. Cl.
*H02J 3/28* (2006.01)
*G05B 15/02* (2006.01)

(56) References Cited

U.S. PATENT DOCUMENTS

| | | | | |
|---|---|---|---|---|
| 8,019,697 | B2* | 9/2011 | Ozog | G06Q 10/06315 705/412 |
| 8,140,194 | B2* | 3/2012 | Iino | H02J 3/14 700/295 |
| 8,401,712 | B2* | 3/2013 | Shimoda | H01M 10/44 320/103 |
| 8,571,955 | B2* | 10/2013 | Al Faruque | G06Q 40/00 705/35 |
| 8,682,495 | B2* | 3/2014 | Carralero | G06F 1/26 700/286 |
| 8,706,650 | B2* | 4/2014 | Ozog | G06Q 10/06 705/412 |
| 8,731,729 | B2* | 5/2014 | Blevins | H02J 3/005 700/291 |
| 8,860,247 | B2* | 10/2014 | Yannane | H02J 9/062 307/23 |
| 9,026,259 | B2* | 5/2015 | Zadeh | H02J 13/0013 700/291 |
| 9,042,141 | B2* | 5/2015 | Yu | H02M 7/537 323/282 |
| 9,172,249 | B2* | 10/2015 | Rockenfeller | H02J 3/38 |
| 9,207,735 | B2* | 12/2015 | Khaitan | G06F 1/263 |
| 9,225,173 | B2* | 12/2015 | Darden, II | H02J 3/381 |
| 9,454,137 | B2* | 9/2016 | Brainard | G05B 13/02 |
| 9,459,643 | B2 | 10/2016 | Miller et al. | |
| 9,960,637 | B2* | 5/2018 | Sanders | H02J 3/381 |
| 2012/0130556 | A1* | 5/2012 | Marhoefer | H02J 3/32 700/291 |
| 2013/0099565 | A1* | 4/2013 | Sachs | H02J 3/46 307/25 |
| 2014/0091622 | A1* | 4/2014 | Lucas | H02J 3/32 307/19 |
| 2014/0277788 | A1* | 9/2014 | Forbes, Jr. | G05F 1/66 700/286 |
| 2015/0214737 | A1 | 7/2015 | Ichino | |
| 2015/0318705 | A1* | 11/2015 | Lucas | H02J 3/381 307/129 |
| 2017/0102726 | A1* | 4/2017 | Goldsmith | G06Q 50/06 |
| 2017/0160711 | A1* | 6/2017 | Wong | G05B 19/042 |
| 2018/0316187 | A1* | 11/2018 | Shim | H02J 3/06 |
| 2019/0052083 | A1* | 2/2019 | Lucas, Jr. | H02J 3/18 |

FOREIGN PATENT DOCUMENTS

| | | |
|---|---|---|
| KR | 20160000285 A | 1/2016 |
| KR | 20160049446 A | 5/2016 |
| KR | 101690742 B1 | 12/2016 |
| WO | 2015134851 A1 | 9/2015 |

OTHER PUBLICATIONS

L.G. Meegahapola; D. Robinson, A.P. Agalgaonkar; S. Perera; and P. Ciufo, "Microgrids of Commercial Buildings: Strategies to Manage Mode Transfer from Grid Connected to Islanded Mode", Oct. 2014, IEEE Transactions on Sustainable Energy. (Year: 2014).*
Mosaddek Hossain Kamal Tushar, "Intelligent Energy Management for Microgrids With Renewable Energy, Storage Systems, and Electric Vehicles", Apr. 2017, A thesis in the Department Electrical and Computer Engineering, Concordia University. (Year: 2017).*
Choi Sang-Ho, et al.; "Suggestion for development of BEMS (Building Energy Management System) business"; (9 pages)—Cited in Korean Office Action dated Apr. 19, 2018.
Hak-Ju Lee, et al.; "The Development & Performance Test of 10 [kW] Power Conditioning System for Microgrid"; accessed Apr. 17, 2018; (9 pages)—Cited in Korean Office Action dated Apr. 19, 2018.
Korean Office Action for related Korean Application No. 10-2017-0055314; action dated Apr. 19, 2018; (9 pages).
Annual Report of Korea Institute of Energy Technology Evaluation and Planning; published Apr. 29, 2016; accompanying English translation of summary; disclosure was derived directly from inventors (52 pages).

* cited by examiner

OPTIMAL OPERATION AND SCHEDULING BASED ON MICROGRID DEMAND STATES

CROSS-REFERENCE TO RELATED APPLICATIONS

Pursuant to 35 U.S.C. § 119(a), this application claims the benefit of earlier filing date and right of priority to Korean Application No. 10-2017-0055314 filed on Apr. 28, 2017, in the Korean Intellectual Property Office, the disclosure of which is hereby incorporated by reference in its entirety.

BACKGROUND

1. Technical Field

The present disclosure relates to a hierarchical power control system.

2. Description of the Related Art

An energy storage system is a system that stores produced power in associated systems including a power plant, a substation, a power line, etc. and increases energy efficiency by selectively and efficiently using the produced power when power is needed.

When the energy storage system may increase an overall load rate by standardizing electric loads largely variable over time and season, the energy storage system may reduce a unit cost of power generation, may reduce investment costs and operating costs needed to build power facilities, resulting in reduction of electric charges and total energy.

The energy storage system has been installed and used in power generation, power transmission and distribution, and customers (houses) for use in power systems, and has been used for frequency regulation, generator power stabilization using new renewable energy, peak shaving, load leveling, emergency power, etc.

The energy storage system is largely classified into a physical energy storage system and a chemical energy storage system according to the energy storage scheme. For physical energy storage, various methods of using compressed air storage, a flywheel, etc. may be used. For chemical energy storage, various methods of using lithium (Li)-ion battery, a lead battery, a sodium-sulfur (NaS) battery, etc. may be used.

However, the energy storage system has failed to integrated-manage directly managed regions (e.g., a microgrid unit) or power conditions of buildings in association with neighbor regions or the building power conditions. Specifically, since there is a difference in peak control time between neighbor regions or buildings, different power generation projects are needed to control power supply-demand states of the respective regions or buildings.

In order to address the above-mentioned issues, demand for systems for integrated-controlling power supply-demand states of neighbor microgrid unit regions is rapidly increasing.

SUMMARY

It is an object of the present disclosure to provide a hierarchical power control system for establishing an optimum integrated operation schedule based on a power supply-demand state of at least one microgrid cell.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a hierarchical power control system associated with a cloud server includes: a first microgrid cell configured to include a first energy storage system (ESS) having an uninterruptible power supply (UPS) structure and a first load having a power state managed by the first energy storage system (ESS); a second microgrid cell configured to include a second load and a second energy storage system (ESS) for managing a power state of the second load; a third microgrid cell including a third load; a middleware server configured to communicate with the first to third microgrid cells; and an integrated control system configured to receive power supply-demand state information of the first to third microgrid cells through the middleware server, and establish an integrated operation schedule based on the received power supply-demand state information of the first to third microgrid cells.

The first microgrid cell may further include a first sensor for detecting a power state of the first load. The second microgrid cell may further include a second sensor for detecting a power state of the second load. The third microgrid cell may further include a third sensor for detecting a power state of the third load. The first to third sensors may respectively detect the power states of the first to third loads, and may transmit the detected power states to the cloud server.

The cloud server may receive at least one of climate data and power associated data from an external part, may synthetically analyze not only the power states of the first to third loads, received from the first to third sensors, but also at least one of the climate data and power associated data received from the external part, may supply the analyzed result to the middleware server.

The middleware server may supply the received analyzed result to the integrated control system. The integrated control system may estimate respective operation schedules of the first to third microgrid cells based on the analyzed result received from the middleware server.

The cloud server may supply the power states of the first to third loads, received from the first to third sensors, to the middleware server. The middleware server may supply the power states of the first to third loads, received from the cloud server, to the integrated control system. The integrated control system may compare the power states of the first to third loads, received from the middleware server, with the integrated operation schedule, and may coordinate the integrated operation schedule based on the result of comparison.

The first microgrid cell may further include an emergency generator, a building associated power system having a first distributed power system, and a first energy management system (EMS) for controlling the emergency generator, the building associated power system, and the first energy storage system (ESS). The second microgrid cell may further include not only a second distributed power system driven associated with the second energy storage system (ESS), but also a second energy management system (EMS) for controlling the second energy storage system (ESS) and the second distributed power system.

The building associated power system may further include: a building energy management system (BEMS), a panel board configured to communicate with the building energy management system (BEMS), a building automation system (BAS) configured to communicate with the building energy management system (BEMS), a cooling/heating system connected to the building automation system (BAS), a first distributed power system connected to the building automation system (BAS), and a third energy storage system (ESS) connected to the building automation system (BAS). The building energy management system (BEMS) may reduce a peak load by controlling at least one of the cooling/heating system, the first distributed power system, and the third energy storage system (ESS) through the building automation system (BAS).

The integrated control system may receive the power supply-demand state information through the middleware server. The power supply-demand state information may receive first power supply-demand state information received from the first energy management system (EMS) and second power supply-demand state information received from the second energy management system (EMS). The first power supply-demand state information may include at least one of power amount information producible in the first microgrid cell, necessary power amount information of the first microgrid cell, and operation schedule information of the first energy storage system (ESS). The second power supply-demand state information may include at least one of power amount information producible in the second microgrid cell, necessary power amount information of the second microgrid cell, and operation schedule information of the second energy storage system (ESS).

The integrated control system may supply the integrated operation schedule to the first and second energy management systems (EMSs) through the middleware server. The first energy management system (EMS) may coordinate a power supply-demand schedule of the first microgrid cell based on the integrated operation schedule received through the middleware server. The second energy management system (EMS) may coordinate a power supply-demand schedule of the second microgrid cell based on the integrated operation schedule received through the middleware server.

In accordance with another aspect of the present disclosure, a hierarchical power control system associated with a cloud server includes a first microgrid cell, a second microgrid cell, a third microgrid cell, and a middleware server. The first microgrid cell includes an emergency generator by which connection to a grid is opened or closed through a closed transition transfer switch (CTTS), a first energy storage system (ESS) driven associated with the emergency generator, and a first load having a power state managed by the first energy storage system (ESS). The second microgrid cell includes a second load and a second energy storage system (ESS) for managing a power state of the second load. The third microgrid cell includes a third load. The middleware server communicates with the first to third microgrid cells. The integrated control system receives power supply-demand state information of the first to third microgrid cells through the middleware server, and establishes an integrated operation schedule based on the received power supply-demand state information of the first to third microgrid cells.

The first microgrid cell may further include not only a building associated power system having a first distributed power system, but also a first energy management system (EMS) for controlling the emergency generator, the building associated power system, and the first energy storage system (ESS). The second microgrid cell may further include not only a second distributed power system driven associated with the second energy storage system (ESS), but also a second energy management system (EMS) for controlling the second energy storage system (ESS) and the second distributed power system.

The integrated control system may receive the power supply-demand state information through the middleware server. The power supply-demand state information may receive first power supply-demand state information received from the first energy management system (EMS) and second power supply-demand state information received from the second energy management system (EMS). The first power supply-demand state information may include at least one of power amount information producible in the first microgrid cell, necessary power amount information of the first microgrid cell, and operation schedule information of the first energy storage system (ESS). The second power supply-demand state information may include at least one of power amount information producible in the second microgrid cell, necessary power amount information of the second microgrid cell, and operation schedule information of the second energy storage system (ESS).

The integrated control system may supply the integrated operation schedule to the first and second energy management systems (EMSs) through the middleware server. The first energy management system (EMS) may coordinate a power supply-demand schedule of the first microgrid cell based on the integrated operation schedule received through the middleware server. The second energy management system (EMS) may coordinate a power supply-demand schedule of the second microgrid cell based on the integrated operation schedule received through the middleware server.

In accordance with another aspect of the present disclosure, a hierarchical power control system associated with a cloud server includes a first microgrid cell, a second microgrid cell, a third microgrid cell, and an integrated control system. The first microgrid cell may include a first energy storage system (ESS) having an uninterruptible power supply (UPS) structure and a first load having a power state managed by the first energy storage system (ESS). The second microgrid cell may include a second load and a second energy storage system (ESS) for managing a power state of the second load. The third microgrid cell may include a third load. The integrated control system may receive power supply-demand state information of the first to third microgrid cells from the first to third microgrid cells, and may establish an integrated operation schedule based on the received power supply-demand state information of the first to third microgrid cells.

The first microgrid cell may further include an emergency generator, a building associated power system having a first distributed power system, and a first energy management system (EMS) for controlling the emergency generator, the building associated power system, and the first energy storage system (ESS). The second microgrid cell may further include not only a second distributed power system driven associated with the second energy storage system (ESS), but also a second energy management system (EMS) for controlling the second energy storage system (ESS) and the second distributed power system.

In accordance with another aspect of the present disclosure, a hierarchical power control system associated with a cloud server includes a first microgrid cell, a second microgrid cell, a third microgrid cell, and a middleware server. The first microgrid cell includes an emergency generator by which connection to a grid is opened or closed through a closed transition transfer switch (CTTS), a first energy storage system (ESS) driven associated with the emergency generator, and a first load having a power state managed by the first energy storage system (ESS). The second microgrid cell includes a second load and a second energy storage system (ESS) for managing a power state of the second load. The third microgrid cell includes a third load. The middleware server communicates with the first to third microgrid cells. The integrated control system receives power supply-demand state information of the first to third microgrid cells through the middleware server, and establishes an integrated operation schedule based on the received power supply-demand state information of the first to third microgrid cells.

In accordance with another aspect of the present disclosure, a hierarchical power control system associated with a cloud server includes a first microgrid cell, a second microgrid cell, a third microgrid cell, and an integrated control system. The first microgrid cell may include an emergency generator by which connection to a grid is opened or closed through a closed transition transfer switch (CTTS), a first energy storage system (ESS) driven associated with the emergency generator, and a first load having a power state managed by the first energy storage system (ESS). The second microgrid cell may include a second load and a second energy storage system (ESS) for managing a power state of the second load. The third microgrid cell may include a third load. The integrated control system may receive power supply-demand state information of the first to third microgrid cells from the first to third microgrid cells, and may establish an integrated operation schedule based on the received power supply-demand state information of the first to third microgrid cells.

DETAILED DESCRIPTION

Figure 1:
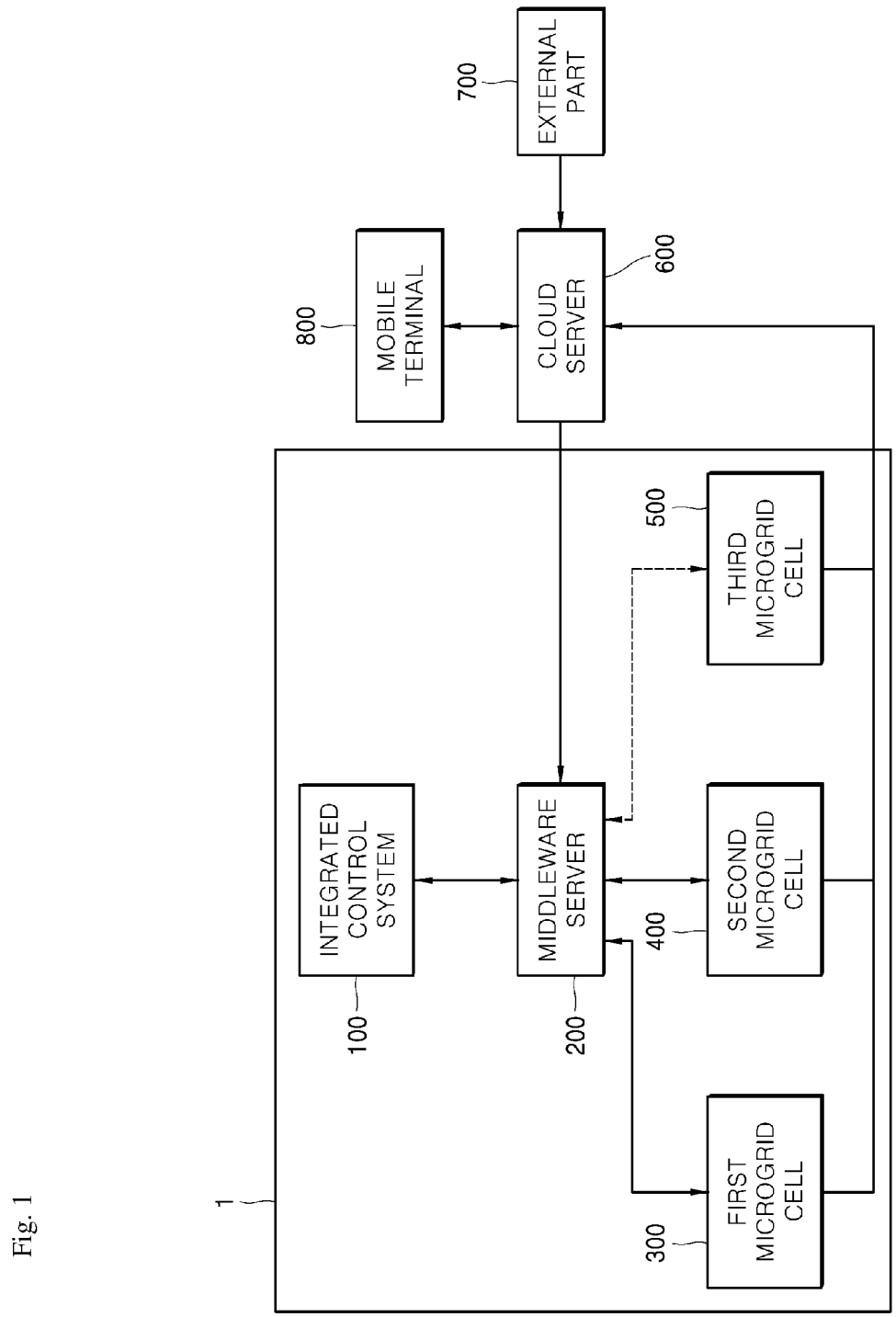
FIG. 1 is a block diagram illustrating a hierarchical power control system according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

A hierarchical power control system according to the embodiments of the present disclosure will hereinafter be described with reference to FIGS. 1 to 3.

FIG. 1 is a block diagram illustrating a hierarchical power control system according to an embodiment of the present disclosure. FIG. 2 is a schematic diagram illustrating first to third microgrid cells shown in FIG. 1. FIG. 3 is a schematic diagram illustrating the first microgrid cell shown in FIG. 2.

Figure 2:
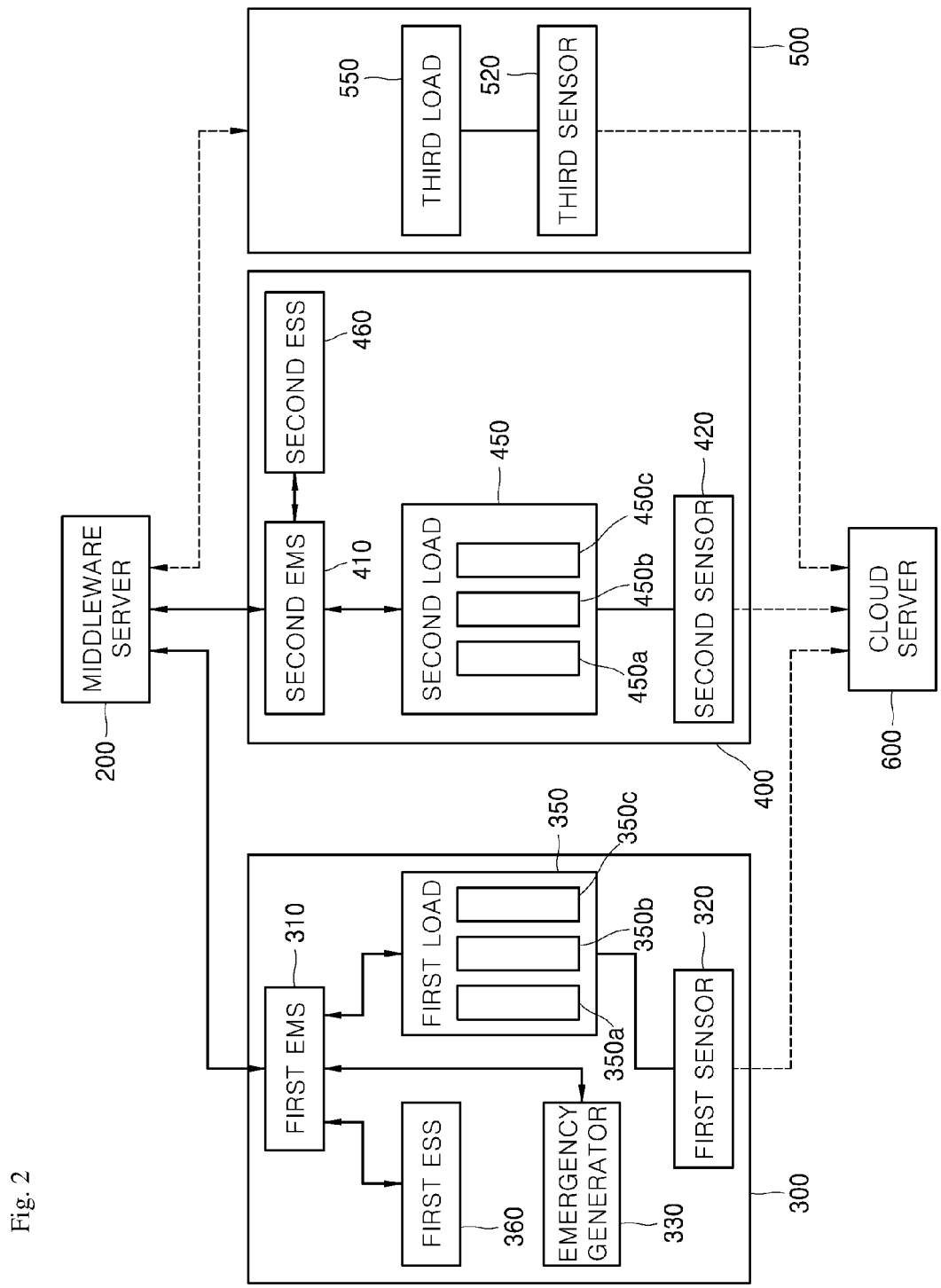
FIG. 2 is a schematic diagram illustrating first to third microgrid cells shown in FIG. 1.

Referring to FIGS. 1 and 2, the hierarchical power control system 1 according to the embodiment of the present disclosure may include an integrated control system 100, a middleware server 200, a first microgrid cell 300, a second microgrid cell 400, and a third microgrid cell 500.

For reference, although the hierarchical power control system 1 of FIG. 1 may further include a cloud server 600, one example in which the hierarchical power control system 1 does not include the cloud server 600 will hereinafter be described for convenience of description and better understanding of the present disclosure.

Although not shown in the drawings, the hierarchical power control system 1 shown in FIG. 1 may further include a grid as necessary. In this case, although the grid is present in each of the first to third microgrid cells (300, 400, 500), only one grid commonly applied to the first to third microgrid cells (300, 400, 500) may also be present as necessary.

For example, the grid may include a power plant, a substation, a power line, etc.

The integrated control system 100 may receive power supply-demand state information of the first to third microgrid cells (300, 400, 500) through the middleware server 200, and may establish the integrated operation schedule based on the power supply-demand state information of the first to third microgrid cells (300, 400, 500). The integrated control system 100 may supply the established integrated operation schedule to the first to third microgrid cells (300, 400, 500) through the middleware server 200, and may control power supply of the first to third microgrid cells (300, 400, 500) to be coordinated based on the integrated operation schedule.

In more detail, the integrated control system 100 may be designed to be largely classified into an integrated monitoring and control function and an optimum power generation and control function.

For example, the integrated monitoring and control function may include a monitoring function, a control function, a reporting function, an alarm function, a calculation function, a database (DB) management function, a trend function, and a screen display function.

The monitoring function may include a status/failure monitoring and instrumentation function of the first to third microgrid cells (300, 400, 500). The control function may include operation/stop/scheduling and optimum operation control functions of facilities included in the first to third microgrid cells (300, 400, 500).

The reporting function may include a function for supplying instrumentation information for each period and manipulation/repair records for each period for the first to third microgrid cells, and the alarm function may include an alarm recognition processing and storage function.

The calculation function may include a function for supplying a calculation/function function to data (e.g., a power factor) to be calculated. The DB management function may include a data interface function through a time database (DB) API (Application Programming Interface).

The trend function may include a function for monitoring change in data. The screen display function may include a function for displaying monitoring, event, alarm, authority, etc. on the screen (for example, a screen of the integrated control system 100 or a screen of a mobile terminal 800 interacting with the cloud server 600).

Meanwhile, the optimum power generation and control function may include, for example, a load estimation function, a solar power generation estimation function, an optimum power generation planning function, an economical power supplying function, an automatic power generation control function, a provisional settlement function, a load blocking function, and an islanding algorithm function.

In this case, the load estimation function may include not only a design function based on an ensemble multi-model combination algorithm to acquire the result using various estimation algorithms, but also a function for acquiring history data of load included in the grid and storing the acquired history data in an Oracle DB.

The solar power generation estimation function may construct a pattern of the probability of rainfall based on rainfall information received from an external part 700 (e.g., the Korea Meteorological Administration) through the cloud server 600, such that the solar power generation estimation function may include a function for estimating the amount of power generation using the K-mean Clustering algorithm, and a function for designing the algorithm by discriminating between estimation associated with the Korea Meteorological Administration and other estimations associated with the Korea Meteorological Administration.

The optimum power generation planning function may include a function for establishing the optimum power generation plans of the first to third microgrid cells (300, 400, 500) in consideration of the power supply states of the first to third microgrid cells (300, 400, 500). A detailed description thereof will hereinafter be described in detail.

The economical power supplying function may include a function for deciding the output of a thermal/electric energy source associated with an energy source driven by the result of the optimum power generation planning, and acquiring the result per microgrid cell.

The automatic power generation control function may include a function for following objectives of a grid association mode (associated stream maintenance) and an independent operation mode (frequency maintenance).

The provisional settlement function may include a function for calculating electric charges based on electrical usage history data.

The load blocking function may include a function for blocking load according to priority information when a load measurement value is higher than a reference value.

The islanding algorithm function may include a function for searching for an electricity interchange and load blocking method during the independent operation.

The integrated control system 100 may receive various kinds of information from the middleware server 200, and may integrated-control the power supply states of the first to third microgrid cells (300, 400, 500) based on the received information. A detailed description thereof will hereinafter be described in detail.

The middleware server 200 may communicate with the first to third microgrid cells (300, 400, 500).

For reference, the middleware server 200 may not exist separately, and may be included in the integrated control system 100. In this case, the integrated control system 100 may also directly communicate with the first to third microgrid cells (300, 400, 500) or the cloud server 600 as necessary.

However, for convenience of description and better understanding of the present disclosure, the embodiment of the present disclosure will exemplarily describe the middleware server 200 that exists separately from the integrated control system 100.

In more detail, the middleware server 200 may supply realtime power status information respectively received from the first, second, and third microgrid cells (300, 400, 500) to the integrated control system 100, and may supply a control command or signal (e.g., an integrated operation schedule) received from the integrated control system 100 to the first to third microgrid cells (300, 400, 500).

In addition, the middleware server 200 may also receive the analysis result from the cloud server 600.

For reference, the cloud server 600 may receive at least one of climate data and power associated data from the external part 700 (e.g., the Korea Meteorological Administration or the Korean Electric Power Corporation (KEPCO)), and may receive power states of first to third loads (350, 450, 550) from first to third sensors (320, 420, 520).

The cloud server 600 may synthesize power states of the first to third loads (350, 450, 550) received from first to third sensors (320, 420, 520) and at least one of climate data and power associated data received from the external part, may analyze the synthesized result, and may supply the analyzed result to the middleware server 200.

That is, the middleware server 200 may supply the analysis result received from the cloud server 600 and the realtime power state information respectively received from the first, second, and third microgrid cells (300, 400, 500) to the integrated control system.

As a result, the integrated control system 100 may integrated-control the power supply states of the first to third microgrid cells (300, 400, 500) based on the analysis result received from the middleware server 200 and the realtime power state information of the first to third microgrid cells (300, 400, 500).

Therefore, although the integrated control system 100 does not receive power supply state information of the respective microgrid cells from a first energy management system (EMS) 300 included in the first microgrid cell 300 or a second EMS 410 included in the second microgrid cell 400, the integrated control system 100 may estimate the respective operation schedules of the first to third microgrid cells (300, 400, 500) based on the analysis result received from the middleware server 200 or the realtime power state information of the first to third microgrid cells (300, 400, 500).

Of course, the integrated control system 100 may coordinate or estimate the integrated operation schedule of at least two of the first to third microgrid cells (300, 400, 500) based on the analysis result received from the middleware server 200 or the realtime power state information of the first to third microcells (300, 400, 500).

The cloud server 600 may supply the power states of the first to third loads (350, 450, 550) to the middleware server 200. The middleware server 200 may supply the power states of the first to third loads (350, 450, 550) received from the cloud server 600 to the integrated control system 100.

Accordingly, the integrated control system 100 may compare the power states of the first to third loads (350, 450, 550) received from the middleware server 200 with the integrated operation schedule, and may coordinate the integrated operation schedule based on the result of comparison.

The cloud server 600 may transmit the power associated information of the mobile terminal 800 by interacting with the mobile terminal 800, and may allow the user to recognize, in real time, the power states of the first to third microgrid cells (300, 400, 500) through the mobile terminal 800.

The first microgrid cell 300 may include not only the first energy storage system (ESS) 360 having an uninterruptible power supply (UPS) structure, but also the first load 350, the power state of which is managed by the first energy storage system (ESS) 360.

Figure 3:
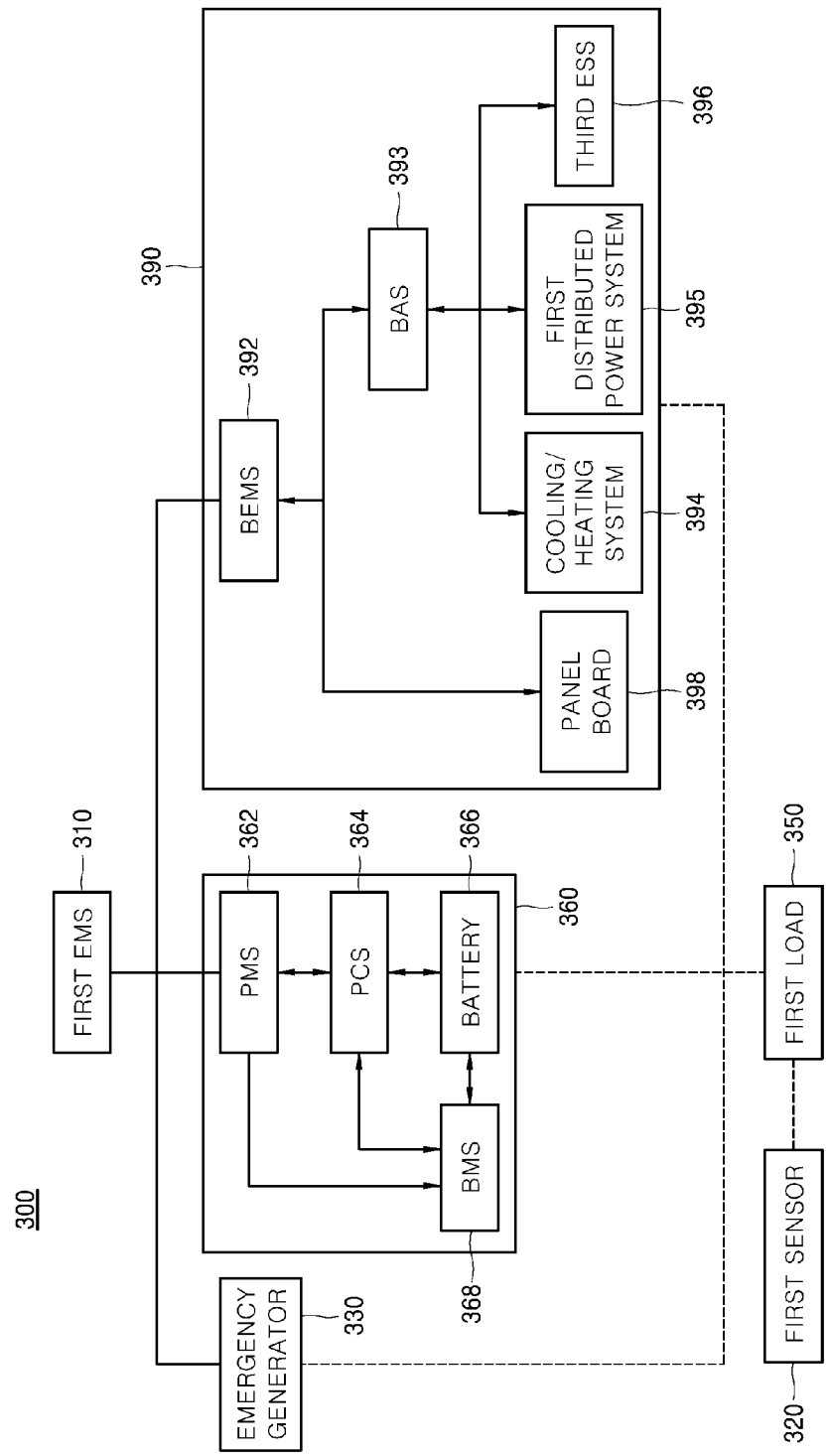
FIG. 3 is a schematic diagram illustrating the first microgrid cell shown in FIG. 2.
Figure 4:
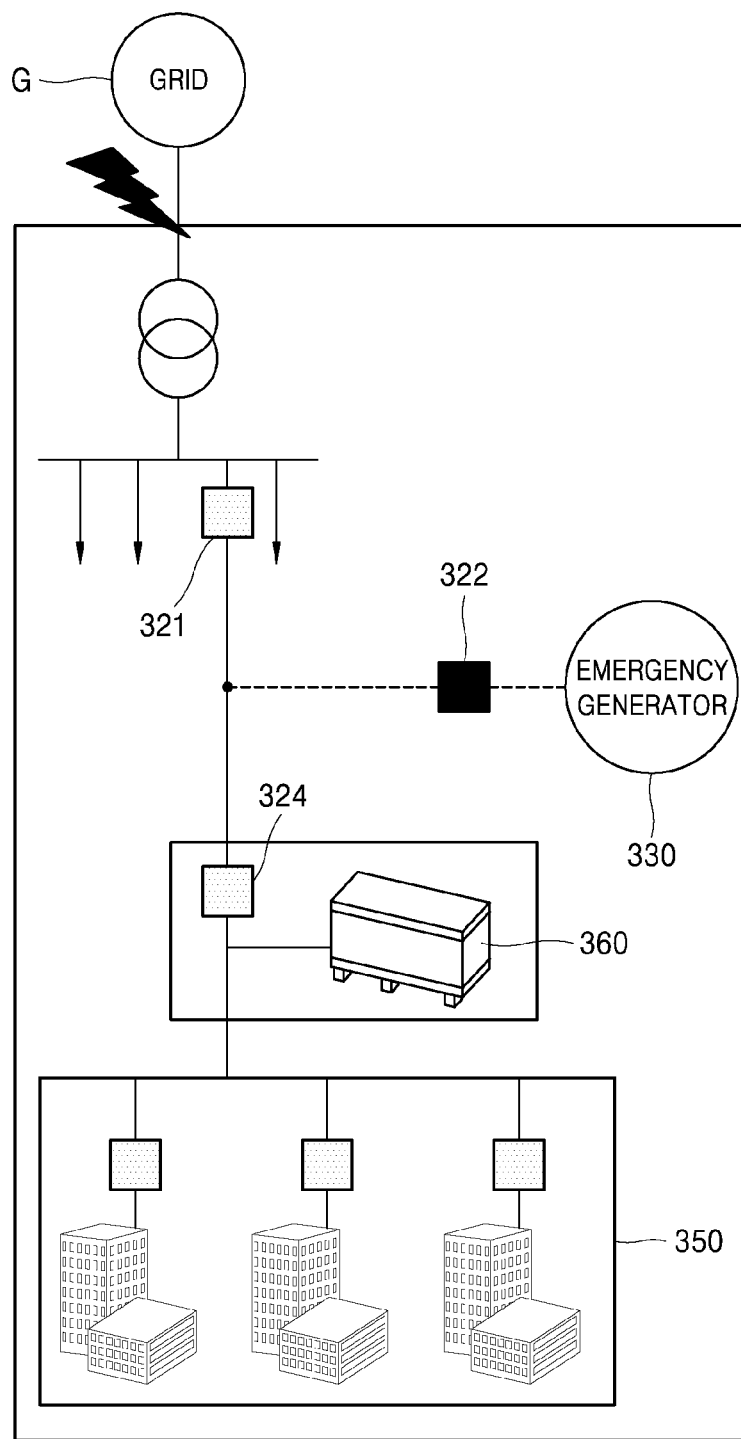
FIGS. 4 to 11 are schematic diagrams illustrating examples of a method for independently operating the first microgrid cell shown in FIG. 3 during power interruption (i.e., power outage) of the grid.
Figure 5:
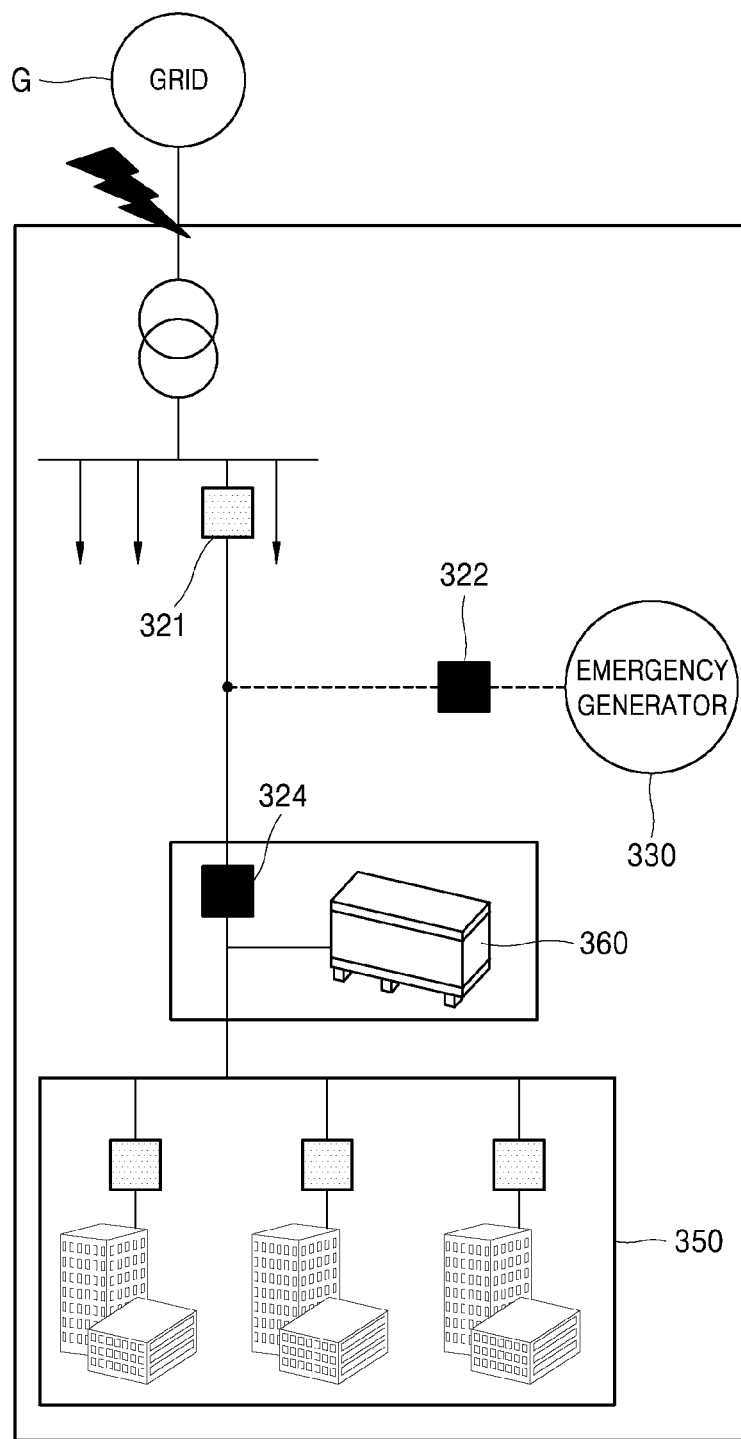
Figure 6:
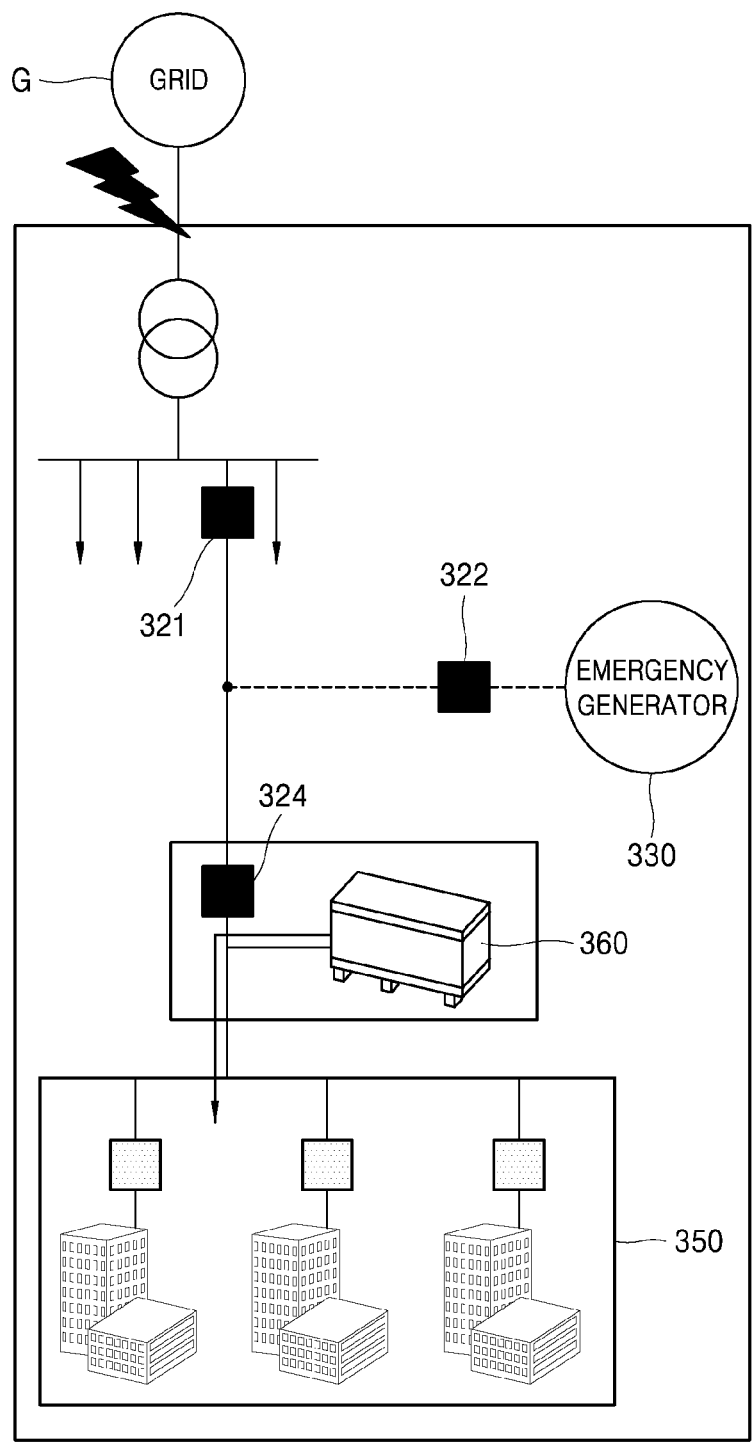

Referring to FIGS. 2 and 3, the first microgrid cell 300 may include the first EMS 310, the first sensor 320, an emergency generator 330, the first ESS 360, a building associated power system 390, and the first load 350.

For reference, the first microgrid cell 300 may not include the emergency generator 330 as necessary. In this case, during power interruption or power recovery of the grid, the first ESS 360 having the UPS structure may supply power to the first load 350 without interruption.

However, for convenience of description and better understanding of the present disclosure, the present disclosure will exemplarily disclose the first microgrid cell 300 equipped with the emergency generator 330.

The first EMS 310 may control the emergency generator 330 and the first ESS 360.

In more detail, the first EMS 310 may manage all the constituent elements included in the first microgrid cell 300. That is, the first EMS 310 may manage the first sensor 320, the emergency generator 330, the first ESS 360, the building associated power system 390, and the first load 350 included in the first microgrid cell 300.

In addition, the first EMS 310 may communicate with the middleware server 200, may transmit power associated data (e.g., first power supply-demand state information) of the first microgrid cell 300 to the middleware server 200, or may receive a control signal or command of the integrated control system 100 from the middleware server 200.

In this case, the first power supply-demand state information may include, for example, at least one of power amount information producible in the first microgrid cell 300, necessary power amount information of the first microgrid cell 300, and operation schedule information of the first ESS 360.

For reference, the first EMS 310 may generate maintenance information of a battery 366 based on battery associated data received from a power management system (PMS) 362, and may also supply the generated maintenance information of the battery 366 to a battery management system (BMS) 368 managing the battery 366 through the PMS 362.

The first sensor 320 may detect a power state of the first load 350.

In more detail, the first sensor 320 may be an IoT sensor having a communication function. The first sensor 320 may detect the power state (e.g., occurrence or non-occurrence of power insufficiency, occurrence or non-occurrence of excessive power, etc.) of the first load 350, and may supply the detected information to the cloud server 600.

The emergency generator 330 may be driven by the first EMS 310 during power interruption of the grid.

In more detail, the emergency generator 330 may be, for example, a diesel generator. The emergency generator 330 may operate by interacting with the first ESS 360. During power interruption of the grid, the emergency generator 330 may control the uninterruptible independent operation of the first microgrid cell 300 to be maintained for a specific time (e.g., 4 hours).

For reference, a conventional diesel generator is used as the emergency generator 330 and a low-capacity ESS is used as the first ESS 360, resulting in reduction of initial investment costs. In addition, through the emergency generator 330, the first microgrid cell 300 may be driven for a long period of time or may be driven in an unlimited independent operation mode, such that reliability of power supply-demand can be guaranteed and the first microgrid cell 300 can be driven in an independent planned operation mode, resulting in guaranteed economic efficiency caused by reduced peak load.

The first ESS 360 may have the UPS structure, and may be designed to operate in an uninterrupted independent operation in preparation for unexpected accidents such as power interruption of the grid, such that the first ESS 360 may implement reliable power supply.

In more detail, during power interruption or power recovery of the grid based on the UPS structure, the first ESS 360 may supply power to the first load 350 without interruption, and may manage the power state of the first load 350.

In this case, the first ESS 360 may include the PMS 362, a PCS(Power Conversion System) 364, the battery 366, and the BMS 368.

The PCS 364 may store power generated by a distributed power system (not shown) (e.g., a new renewable energy system such as a solar or wind-power energy system) in the battery 366, or may transfer the generated power to the grid or the first load 350. The PCS 364 may transmit power stored in the battery 366 to the grid or the first load 350. The PCS 364 may also store power supplied from the grid in the battery 366.

The PCS 364 may control charging or discharging of the battery 366 based on a State of Charge (SOC) level of the battery 366.

For reference, the PCS 364 may make a schedule of the operation of the first ESS 360 based on power rates of the power market, power generation planning of the distributed power system, the amount of power generation, and a power demand of the grid, etc.

The battery 366 may be charged or discharged by the PCS 364.

In more detail, the battery 366 may receive power from at least one of the distributed power system and the grid, may store the received power therein, and may supply the stored power to at least one of the grid and the first load 350. The battery 366 may be comprised of at least one battery cell, and each battery cell may include a plurality of bare cells.

The BMS 368 may monitor the state of the battery 366, and may control the charging and discharging operation of the battery. The BMS 368 may monitor battery 366's state including the SOC level indicating the SOC of the battery 366, and may supply the monitored battery 366's SOC information (e.g., voltage, current, temperature, the residual power amount, lifespan, SOC, etc. of the battery 366) to the PCS 364.

The BMS 368 may perform the protection operation for protecting the battery 366. For example, the BMS 368 may perform at least one of various functions of the battery 366, for example, an overcharge protection function, an overdischarge protection function, an overcurrent protection function, an overvoltage protection function, an overheating protection function, and a cell balancing function of the battery 366.

The BMS 368 may regulate the SOC level of the battery 366.

In more detail, the BMS 368 may receive a control signal from the PCS 364, and may regulate the SOC level of the battery 366 based on the received control signal.

The PMS 362 may control the PCS 364 based on the battery (366) associated data received from the BMS 368.

In more detail, the PMS 362 may monitor the SOC of the battery 366, and may monitor the state of the PCS 364. That is, the PMS 362 may control the PCS 364 based on the battery(366) associated data received from the BMS 368.

The PMS 362 may collect the battery(366) associated data by monitoring the SOC of the battery 366 through the BMS 368, and may supply the battery associated data to the first EMS 310.

The building associated power system 390 may include a building energy management system (BEMS) 392, a panel board 398, a building automation system (BAS) 393, a cooling/heating system 394, a first distributed power system 395, and a third ESS 396.

In more detail, the BEMS 392 may reduce a peak load by controlling at least one of the cooling/heating system 394, the first distributed power system 395, and the third ESS 396 through the BAS 393, and may also control the panel board 398.

The panel board 398 and the BAS 393 may be controlled by communicating with the BEMS 392. The cooling/heating system 394, the first distributed power system 395, and the third ESS 396 may be controlled by the BEMS 392 by connecting to the BAS 393.

The building associated power system 390 may be optimally controlled for power saving, resulting in reduction of energy costs and peak load.

The power state of the first load 350 may be managed by the first ESS 360. For example, the first load 350 may include homes, large buildings, factories, etc.

In more detail, power supply and demand of the first load 350 may be managed by at least one of the first ESS 360, the emergency generator 330, and the building associated power system 360. The first load 350 may be connected to the first sensor 320.

For reference, the first load 350 may be significant loads (e.g., laboratory building, hospital, etc.) for which uninterruptible high-quality power supply is needed.

Therefore, when the power interchange task or the integrated operation schedule of the integrated control system 100 is established, priority (i.e., importance ranking) of the first load 350 may be higher than priority (i.e., importance ranking) of each of the second load 450 and the third load 550.

The second microgrid cell 400 may include the second load 450 and the second ESS 460 for managing the power state of the second load 450.

In more detail, the second microgrid cell 400 may include the second EMS 410, the second sensor 420, the second load 450, and the second ESS 460.

For reference, although not shown in the drawings, the second microgrid cell 400 may further include the second distributed power system (not shown) (e.g., a new renewable energy system such as a solar or wind-power energy system) that is driven associated with the second ESS 460.

The second EMS 410 may control the second ESS 460 and the second distributed power system.

In more detail, the second EMS 410 may manage all the constituent elements included in the second microgrid cell 400. That is, the second EMS 410 may manage the second sensor 320, the second load 450, the second ESS 460, and the second distributed power system included in the second microgrid cell 300.

In addition, the second EMS 410 may communicate with the middleware server 200, may transmit power associated data (e.g., second power supply-demand state information) of the second microgrid cell 400 to the middleware server 200, or may receive a control signal or command of the integrated control system 100 from the middleware server 200.

In this case, the second power supply-demand state information may include, for example, at least one of power amount information producible in the second microgrid cell 400, necessary power amount information of the second microgrid cell 400, and operation schedule information of the second ESS 460.

The second sensor 420 may detect the power state of the second load 450.

In more detail, the second sensor 420 may be an IoT sensor having a communication function. The second sensor 420 may detect the power state (e.g., occurrence or non-occurrence of power insufficiency, occurrence or non-occurrence of excessive power, etc.) of the second load 450, and may supply the detected information to the cloud server 600.

The power state of the second load 450 may be managed by the second ESS 460. For example, the second load 450 may include homes, large buildings, factories, etc.

In more detail, power supply and demand of the second load 450 may be managed by the second ESS 460. The second load 450 may be connected to the second sensor 420.

For reference, the second load 450 may be a general load (e.g., a classroom building, a dormitory, etc.), energy efficiency of which is needed in association with the second distributed power system.

The second load 450 may include at least one of the loads 450a to 450c having different priorities.

Therefore, during peak control, a high-priority load from among loads included in the second load 450 may receive power, and a low-priority load may not receive power.

That is, whereas the high-priority load (e.g., 450a) from among loads included in the second load 450 can continuously receive power during peak control, the low-priority load (e.g., 450b or 450c) may not receive power during peak control.

In brief, when an event such as peak control occurs in the second microgrid cell 400, loads to be selectively driven based on characteristics or priority may be included in the second microgrid cell 400.

The second ESS 460 may manage the power state of the second load 450, and may perform peak control.

The second ESS 460 includes the PMS, the battery, the BMS, and the PCS in the same manner as in the first ESS 360, and as such a detailed description thereof will herein be omitted for convenience of description.

The third microgrid cell 500 may include the third load 550.

In more detail, the third microgrid cell 500 may include the third sensor 520 and the third load 550.

For reference, differently from the second microgrid cell 400, the EMS, the ESS, or the distributed power system may not exist in the third microgrid cell 500. Therefore, the power supply-demand state information of the third microgrid cell 500 may be applied to the middleware server 200 after passing through the cloud server 600 through the third sensor 520.

Of course, the third sensor 520 of the third microgrid cell 500 communicates with the middleware server 200, such that the third sensor 520 may directly transmit the power state of the third load 550 to the middleware server 200 as necessary.

The third sensor 520 may detect the power state of the third load 550.

In more detail, the third sensor 520 may be an IoT sensor having a communication function. The third sensor 520 may detect the power state (e.g., occurrence or non-occurrence of power insufficiency, occurrence or non-occurrence of excessive power, etc.) of the third load 550, and may supply the detected information to the cloud server 600.

The third load 550 may include, for example, homes, large buildings, factories, etc.

In more detail, the third load 550 may be connected to the third sensor 520.

For reference, the second load 450 may be a general load unrelated to the distributed power system, and may aim to provide an energy saving service based on the analysis result obtained through the third sensor 520. In detail, the energy saving service based on the analysis result obtained through the third sensor 520 may allow the user to realtime-recognize the power state of the third load 550 through the mobile terminal 800 communicating with the cloud server 600 by transmitting the power state information of the third load 550 to the cloud server 600.

A method for independently operating the first microgrid cell shown in FIG. 3 during power interruption of the grid will hereinafter be described with reference to FIGS. 4 to 11.

FIGS. 4 to 11 are schematic diagrams illustrating examples of a method for independently operating the first microgrid cell shown in FIG. 3 during power interruption (i.e., power outage) of the grid.

For reference, for convenience of description and better understanding of the present disclosure, some constituent elements not shown in FIG. 3 may be added to the first microgrid cell 300 of FIGS. 4 to 11, or some constituent elements shown in FIG. 3 will herein be omitted from the first microgrid cell 300 shown in FIGS. 4 to 11.

Referring to FIGS. 3 to 6, during power interruption of the grid G, a static transfer switch (STS) may detect power interruption of the grid (G) so as to sever connection to the grid G, the first ESS 360 may switch from a constant-power mode to a Constant Voltage Constant Frequency (CVCF) mode, and may thus independently supply power to the first load 350.

In more detail, the STS 324 may open or close connection between the grid G and the first ESS 360 or may open or close connection between the grid G and the first load 350.

For example, the STS 324 may detect power interruption of the grid G within a given time of 4 ms during power interruption of the grid G, such that the STS 324 may sever connection to the grid G.

During power interruption of the grid G, the first ESS 360 may switch to the CVCF mode within 10 ms, and may then stably supply power to the first load 350 (i.e., uninterrupted independent operation of the first ESS 360)

In this case, a circuit breaker 321 installed in the grid G may also sever connection to the grid G.

Figure 7:
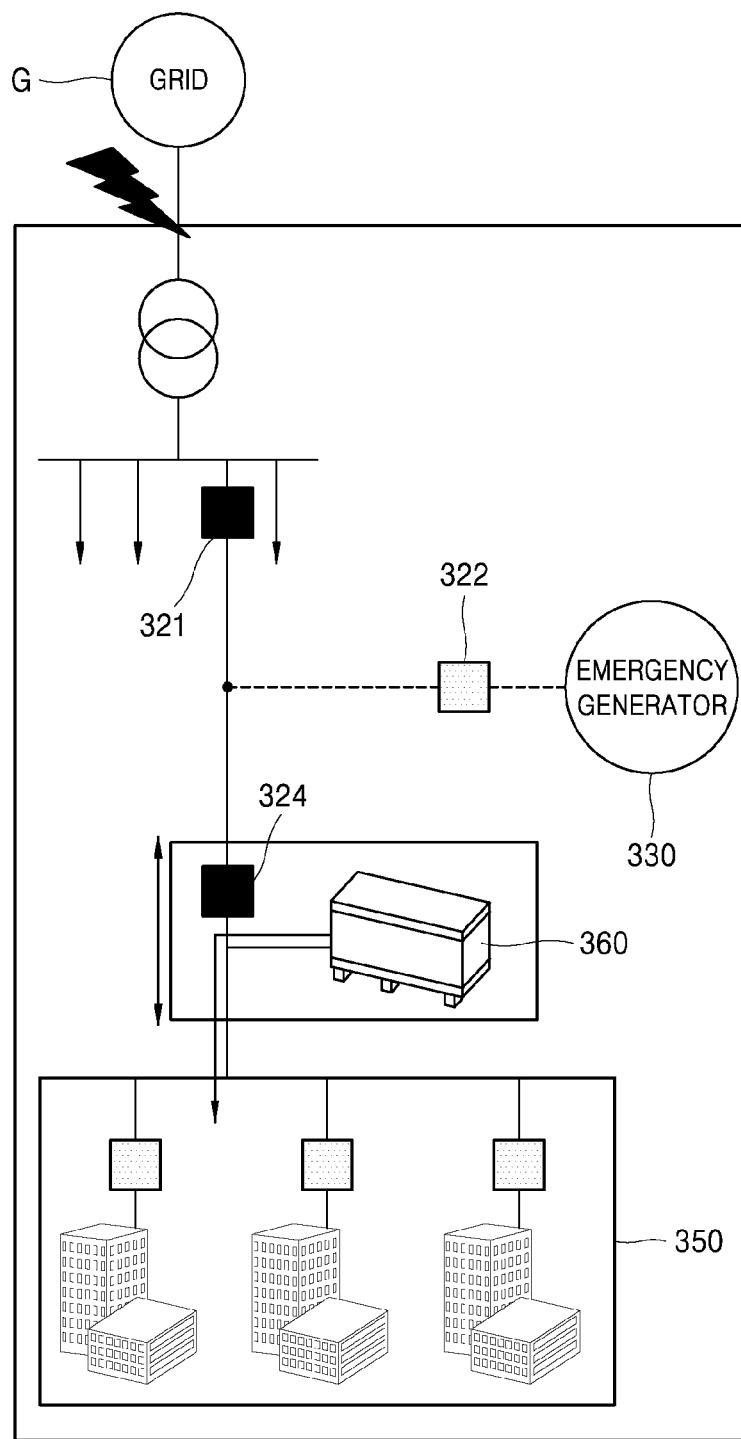
Figure 8:
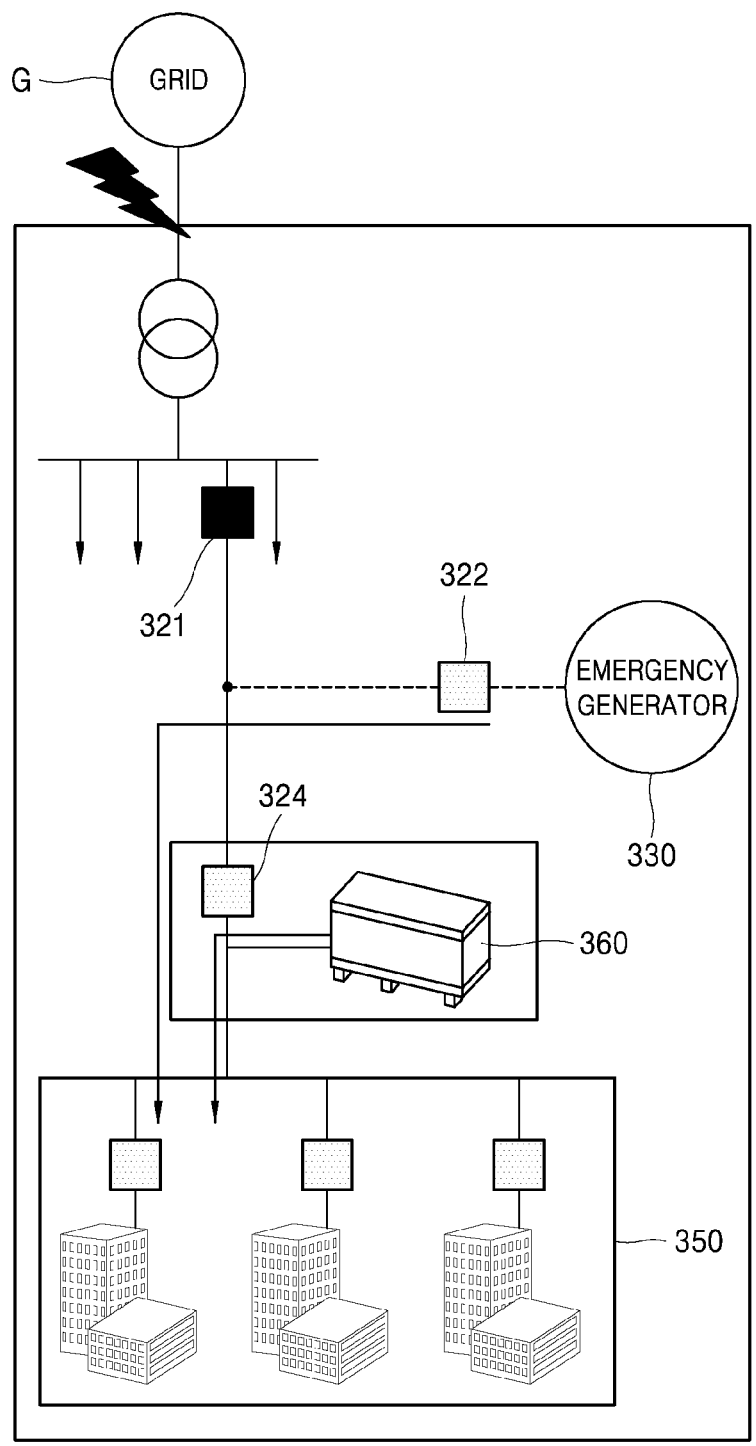
Figure 9:
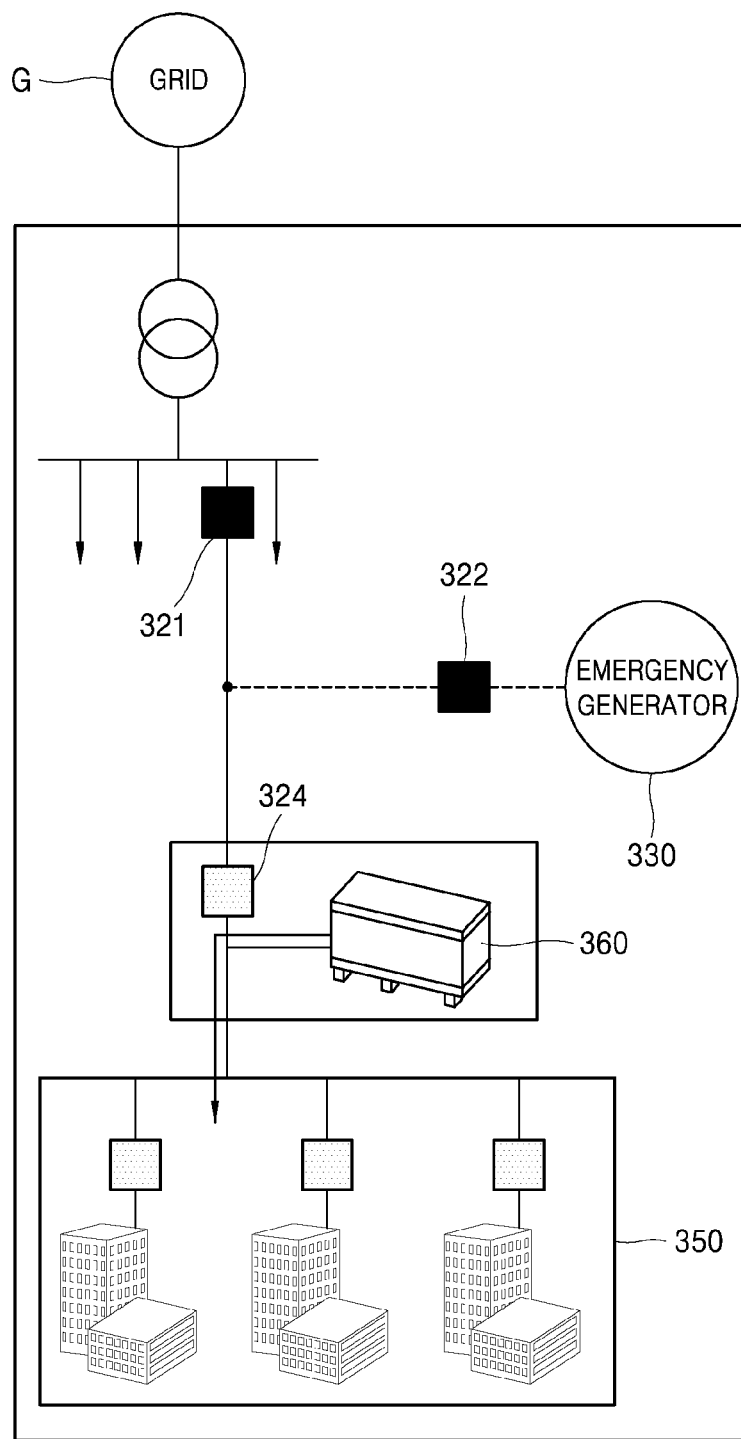
Figure 10:
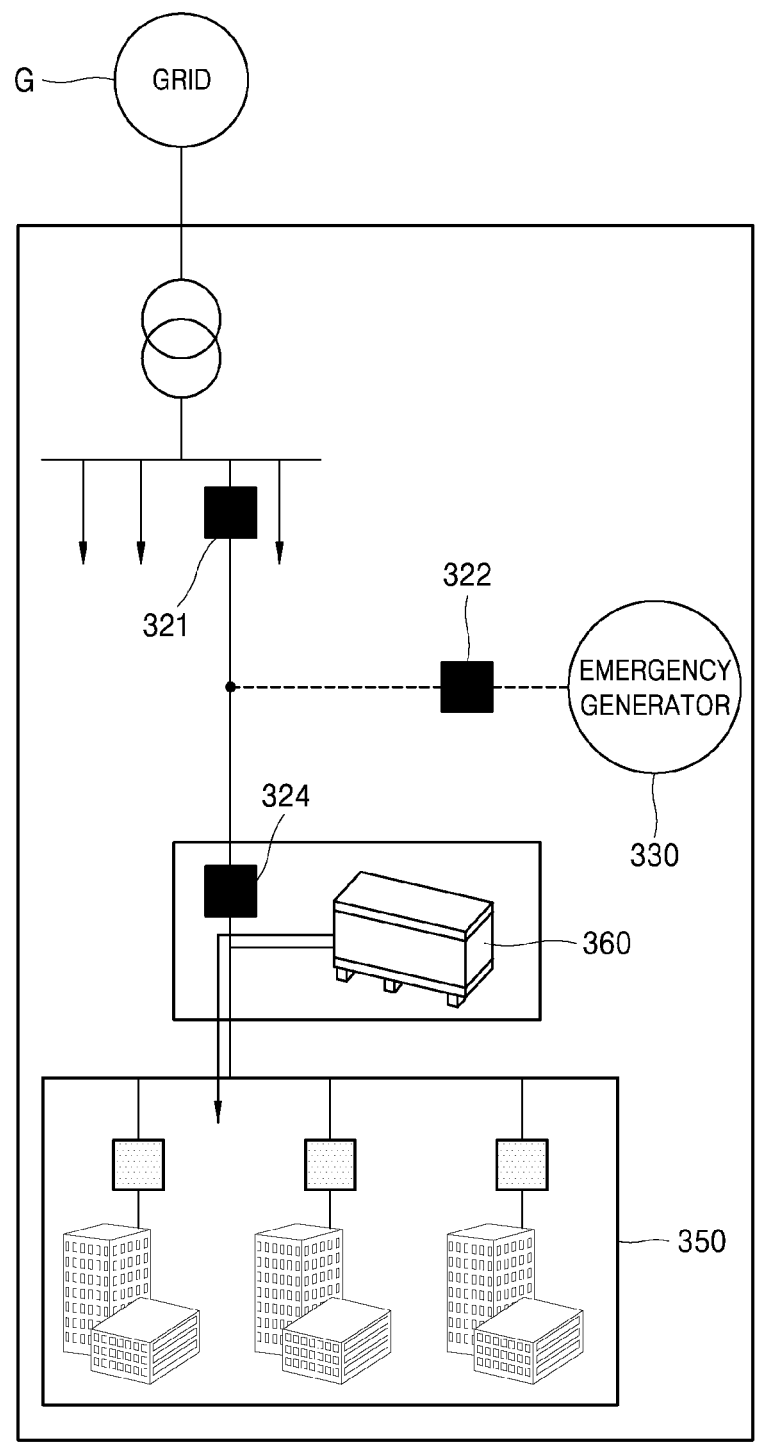
Figure 11:
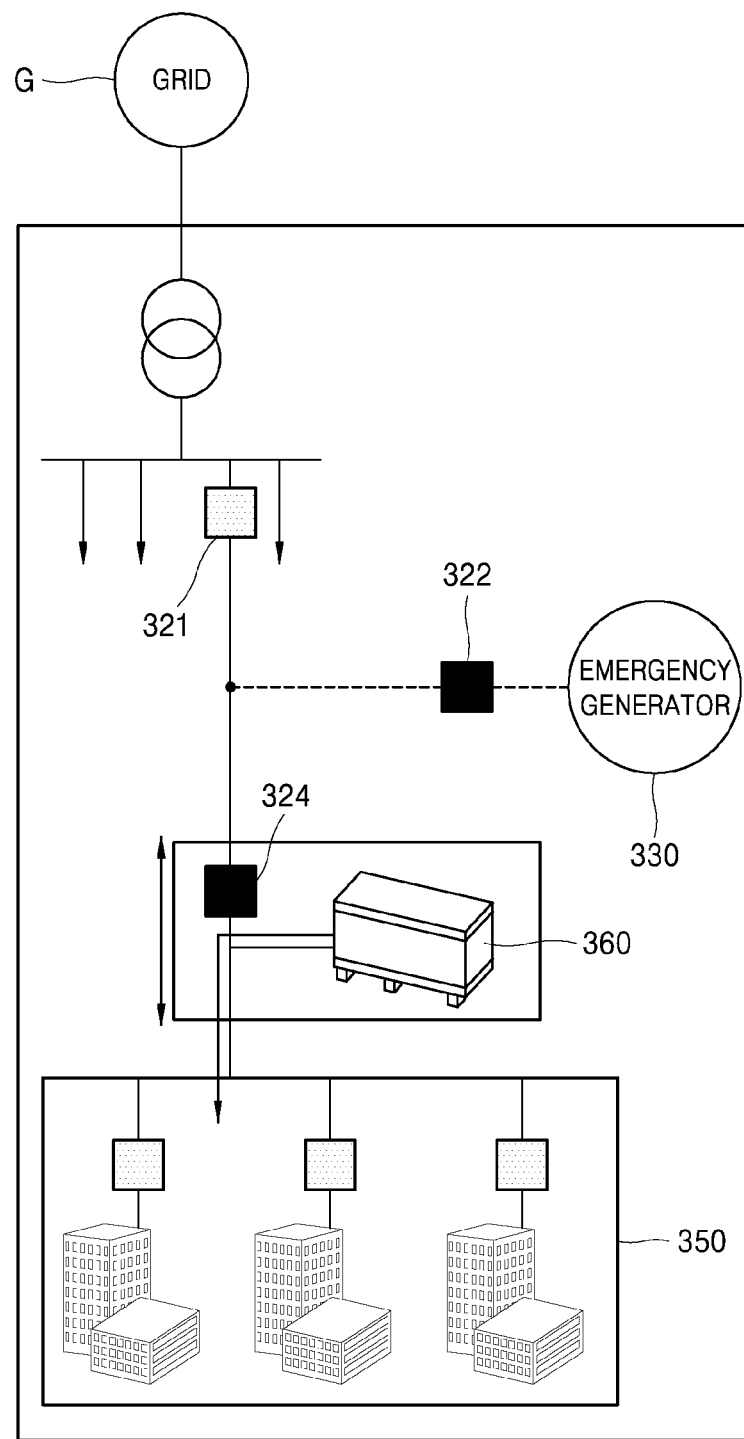
Figure 12:
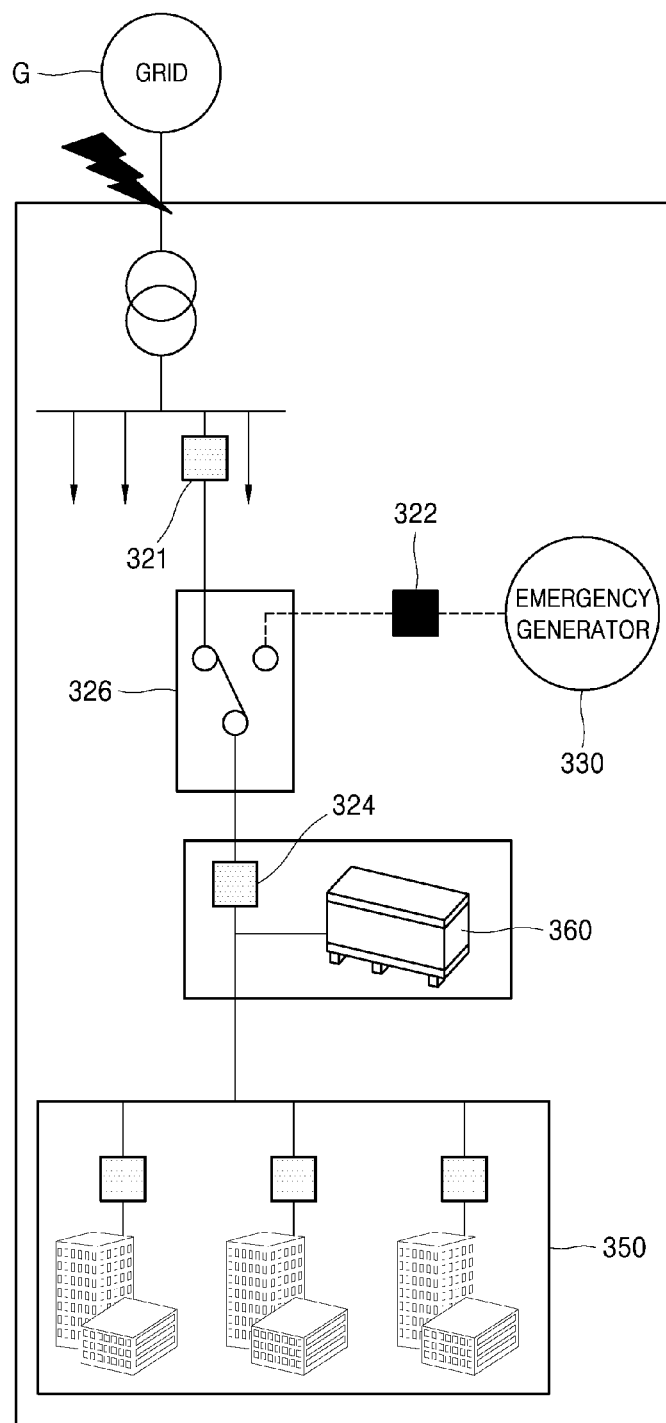
FIGS. 12 to 21 are schematic diagrams illustrating other examples of a method for independently operating the first microgrid cell shown in FIG. 3 during power interruption of the grid.
Figure 13:
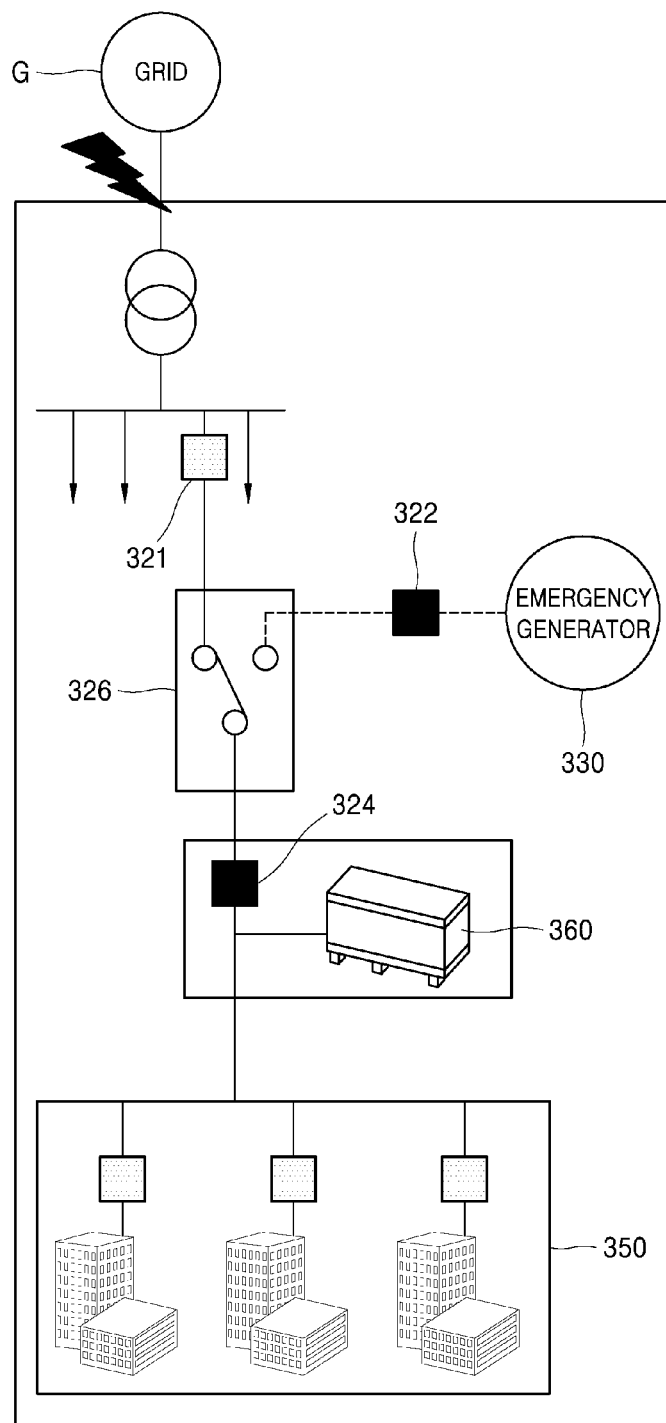
Figure 14:
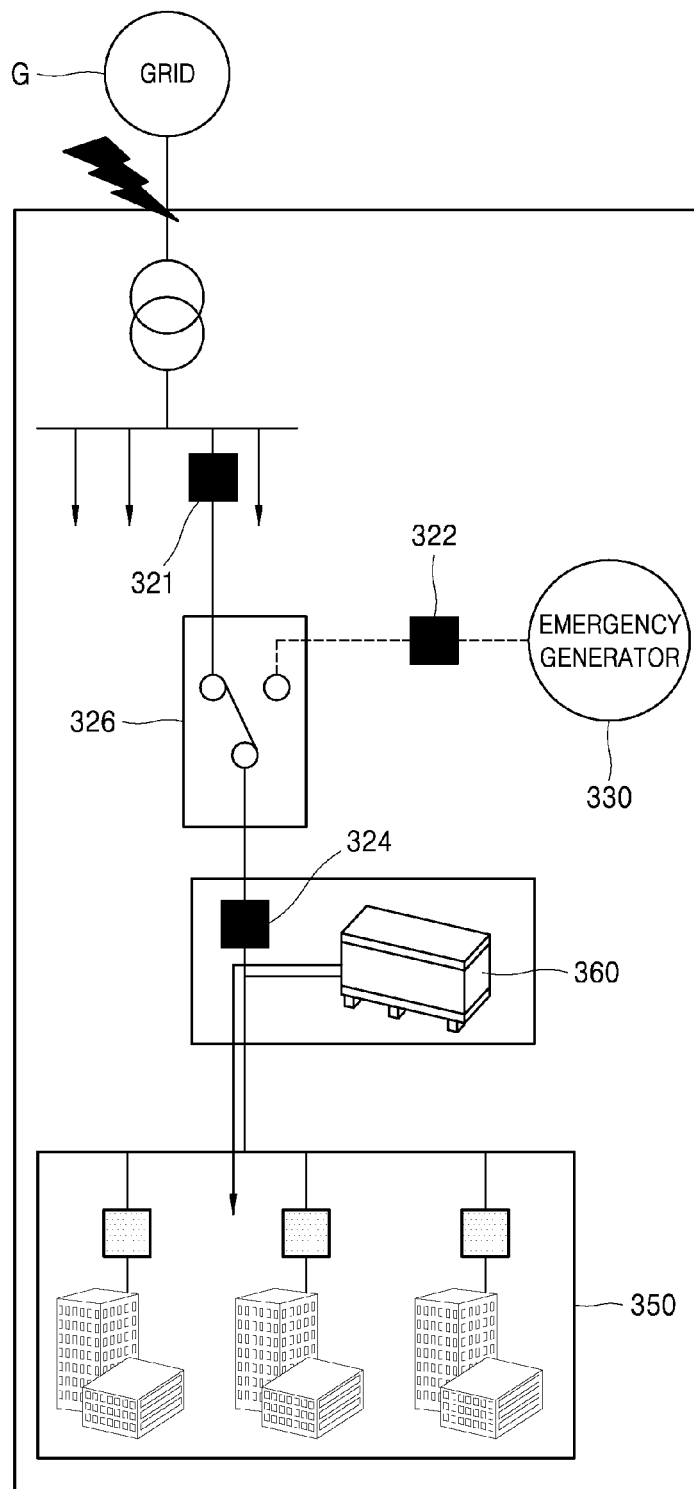
Figure 15:
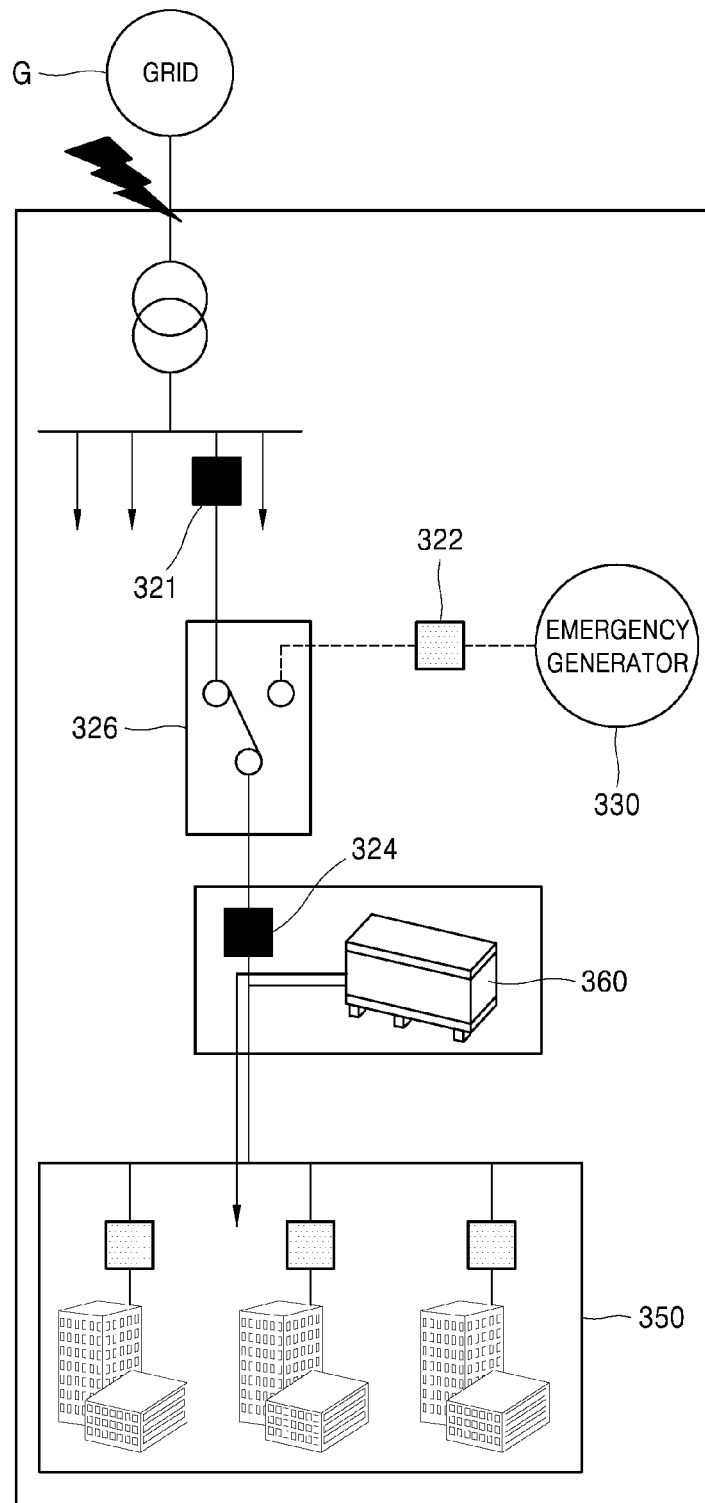
Figure 16:
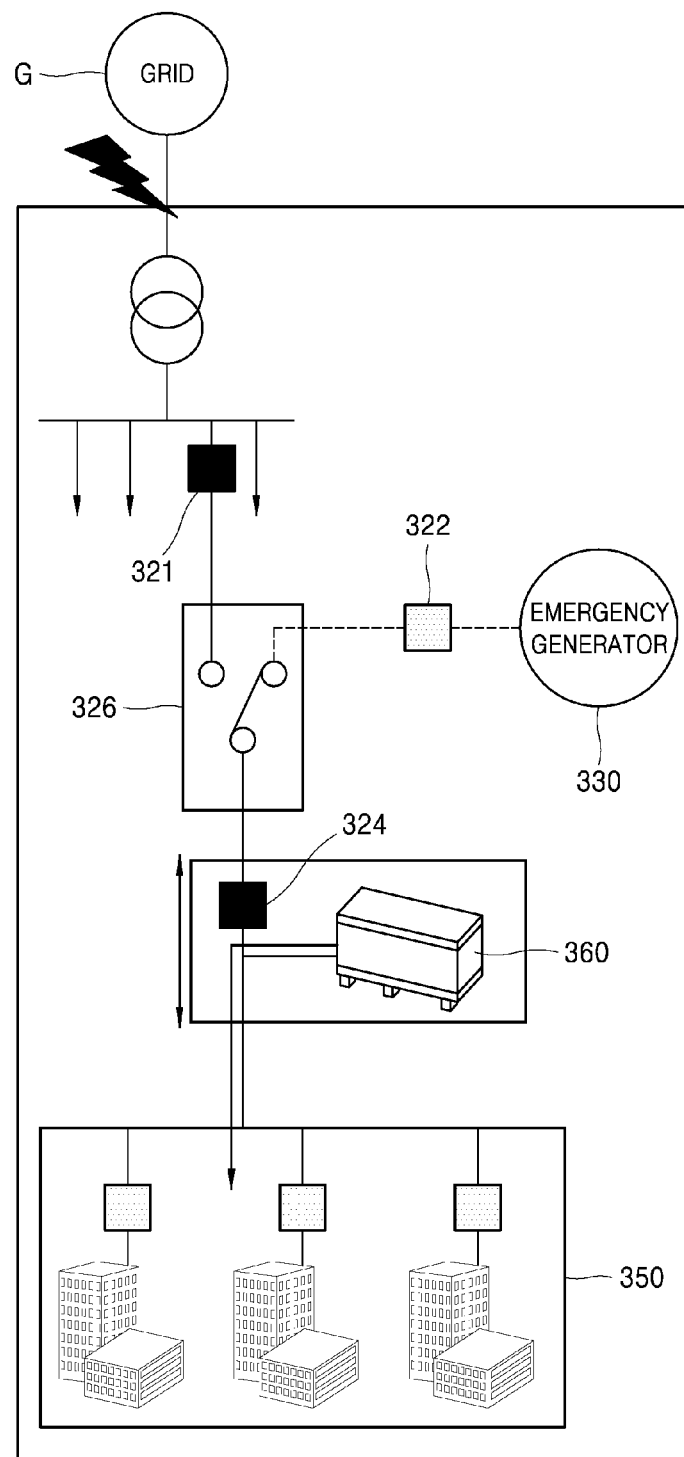
Figure 17:
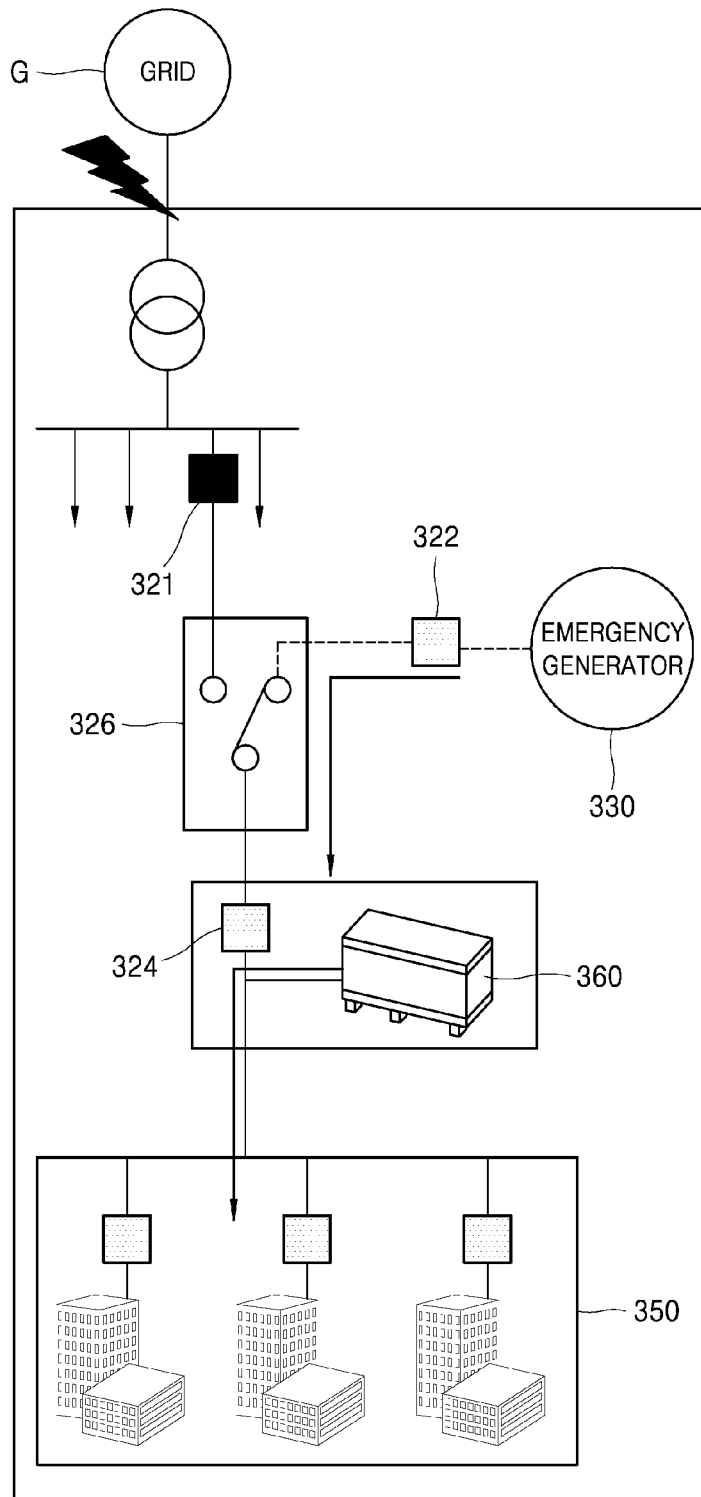

Subsequently, referring to FIGS. 3, 7, and 8, when the first ESS 360 independently supplies power to the first load 350 by switching to the CVCF mode, the first EMS 310 may operate the emergency generator 330, and the emergency generator 330 driven by the first EMS 310 may supply power to the first load 350.

In this case, although the circuit breaker 322 installed in the emergency generator 330 activates connection to the emergency generator 330, connection between the emergency generator 330 and the first load 350 may be cut off by the STS 324. As a result, the emergency generator 330 may be driven with no load.

When the STS 324 detects power supplied from the emergency generator 330, the STS 324 may supply a first notification message to the first ESS 360. When the first ESS 360 receives the first notification message from the STS 324, the first ESS 360 may perform a first synchronization algorithm.

For reference, the first synchronization algorithm may be an algorithm for synchronizing a frequency, a voltage, and a phase angle of the first ESS 360 with a frequency, a voltage, and a phase angle of the emergency generator 330.

When the first synchronization algorithm of the first ESS 360 is performed, the STS 342 may release disconnection to the grid G, the emergency generator 330 may be driven in a frequency following mode, and the first ESS 360 may be re-driven in the constant-power mode.

Therefore, the first load 350 may stably receive power from the emergency generator 330 and the first ESS 360 until reaching power recovery of the grid G.

Subsequently, referring to FIGS. 3, 9, 10 and 11, the first EMS 310 may stop operation of the emergency generator 330 during power recovery of the grid G.

In this case, the circuit breaker 322 installed in the emergency generator 330 may sever connection to the emergency generator 330.

The STS 324 may detect stoppage of the emergency generator 330, may supply a second notification message to the first ESS 360, and may sever connection to the grid G.

Upon receiving the second notification message from the STS 324, the first ESS 360 may switch from the constant-power mode to the CVCF mode, such that the first ESS 360 may independently supply power to the first load 350.

If the circuit breaker 321 mounted to the grid G is reactivated and power is supplied from the grid G to the first load 350, the STS 324 may detect the power supplied from the grid G and thus supply a third notification message to the first ESS 360.

Upon receiving the third notification message from the STS 324, the first ESS 360 may perform a second synchronization algorithm. If the first ESS 360 performs the second synchronization algorithm, the STS 324 may again release disconnection to the grid G.

In this case, the second synchronization algorithm may be an algorithm for synchronizing a frequency, a voltage, and a phase angle of the first ESS 360 with a frequency, a voltage, and a phase angle of the grid G.

Since the STS 324 again releases disconnection to the grid G, the first microgrid cell 300 may be normally recovered to a previous state that has existed prior to power interruption of the grid G.

Through the above-mentioned process, during power interruption of the grid G, the first microgrid cell 300 may be driven in an independent operation mode.

The independent operation mode of the first microgrid cell 300 may implement uninterrupted independent operation using a low-capacity battery (i.e., battery 366 included in the first ESS 360), resulting in reduction of production costs. In addition, the independent operation mode of the first microgrid cell 300 may be driven independently for a long period of time (e.g., at least 4 hours) through parallel operation of the emergency generator 330 and the first ESS 360.

A method for independently operating the first microgrid cell shown in FIG. 3 during power interruption of the grid will hereinafter be described with reference to FIGS. 12 to 21.

FIGS. 12 to 21 are schematic diagrams illustrating other examples of a method for independently operating the first microgrid cell shown in FIG. 3 during power interruption of the grid.

For reference, for convenience of description and better understanding of the present disclosure, some constituent elements not shown in FIG. 3 may be added to the first microgrid cell 300 of FIGS. 12 to 21, or some constituent elements shown in FIG. 3 will herein be omitted from the first microgrid cell 300 shown in FIGS. 12 to 21.

Referring to FIGS. 3, 12, 13 and 14, during power interruption of the grid G, the static transfer switch (STS) may detect power interruption of the grid (G) so as to sever connection to the grid G, the first ESS 360 may switch from a constant-power mode to a Constant Voltage Constant Frequency (CVCF) mode, and may thus independently supply power to the first load 350.

In more detail, the STS 324 may open or close connection between the grid G and the first ESS 360 or may open or close connection between the grid G and the first load 350.

For example, the STS 324 may detect power interruption of the grid G within a given time of 4 ms during power interruption of the grid G, such that the STS 324 may sever connection to the grid G.

During power interruption of the grid G, the first ESS 360 may switch to the CVCF mode within 10 ms, and may then stably supply power to the first load 350 (i.e., uninterrupted independent operation of the first ESS 360).

In this case, the circuit breaker 321 installed in the grid G may also sever connection to the grid G.

Subsequently, referring to FIGS. 3, 15, 16 and 17, when the first ESS 360 independently supplies power to the first load 350 by switching to the CVCF mode, the first EMS 310 may operate the emergency generator 330.

If the emergency generator 330 is driven, a closed transition transfer switch (CTTS) may sever connection between the emergency generator 330 and the grid G, and at the same time may connect the emergency generator 330 to the STS 324, such that the emergency generator 330 may supply power to the first load 350.

In more detail, the CTTS 326 may open or close connection between the grid G and the STS 324, and may open or close connection between the grid G and the emergency generator 330. That is, the CTTS 326 may perform switching from the grid G to the emergency generator 330 without power interruption, or may perform switching from the emergency generator 330 to the grid G without power interruption.

In this case, whereas the circuit breaker 322 mounted to the emergency generator 330 activates connection to the emergency generator 330, connection between the emergency generator 330 and the first load 350 may be cut off by the STS 342. As a result, the emergency generator 330 may be driven with no load.

When the STS 324 detects power supplied from the emergency generator 330, the STS 324 may supply a first notification message to the first ESS 360. When the first ESS 360 receives the first notification message from the STS 324, the first ESS 360 may perform a first synchronization algorithm.

For reference, the first synchronization algorithm may be an algorithm for synchronizing a frequency, a voltage, and a phase angle of the first ESS 360 with a frequency, a voltage, and a phase angle of the emergency generator 330.

When the first synchronization algorithm of the first ESS 360 is performed, the STS 342 may release disconnection to the grid G, the emergency generator 330 may be driven in a frequency following mode, and the first ESS 360 may be re-driven in the constant-power mode.

Therefore, the first load 350 may stably receive power from the emergency generator 330 and the first ESS 360 until reaching power recovery of the grid G.

Subsequently, referring to FIGS. 3, 18 and 19, the circuit breaker 321 mounted to the grid G may be activated during power recovery of the grid G.

During power recovery of the grid G, the first EMS 310 may stop operation of the emergency generator 330, and the CTTS 326 may sever connection between the emergency generator 330 and the STS 324 by detecting stoppage of the emergency generator 330, resulting in connection between the STS 324 and the grid G.

In this case, the circuit breaker 322 mounted to the emergency generator 330 may sever connection to the emergency generator 330.

If the STS 324 is connected to the grid G, the CTTS 326 may perform the CTTS-based synchronization algorithm, such that the CTTS 326 may synchronize power supplied from the grid G with power of the first ESS 360.

In this case, the CTTS-based synchronization algorithm may be an algorithm for synchronizing a frequency, a voltage, and a phase angle of the first ESS 360 with a frequency, a voltage, and a phase angle of the grid G.

Since the STS 324 is connected to the grid G and power supplied from the grid G is synchronized with power of the first ESS 360, the first microgrid cell 300 may be normally recovered to a previous state that has existed prior to power interruption of the grid G.

Figure 18:
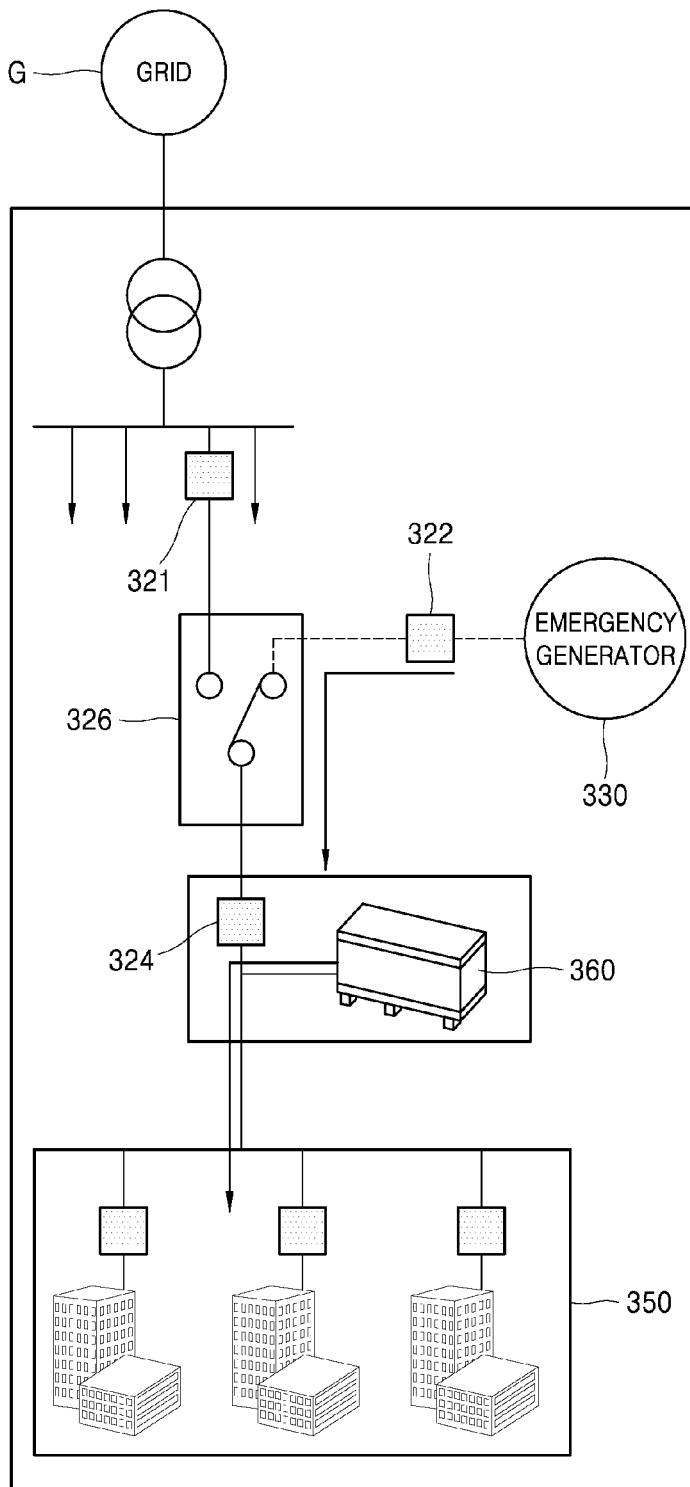
Figure 19:
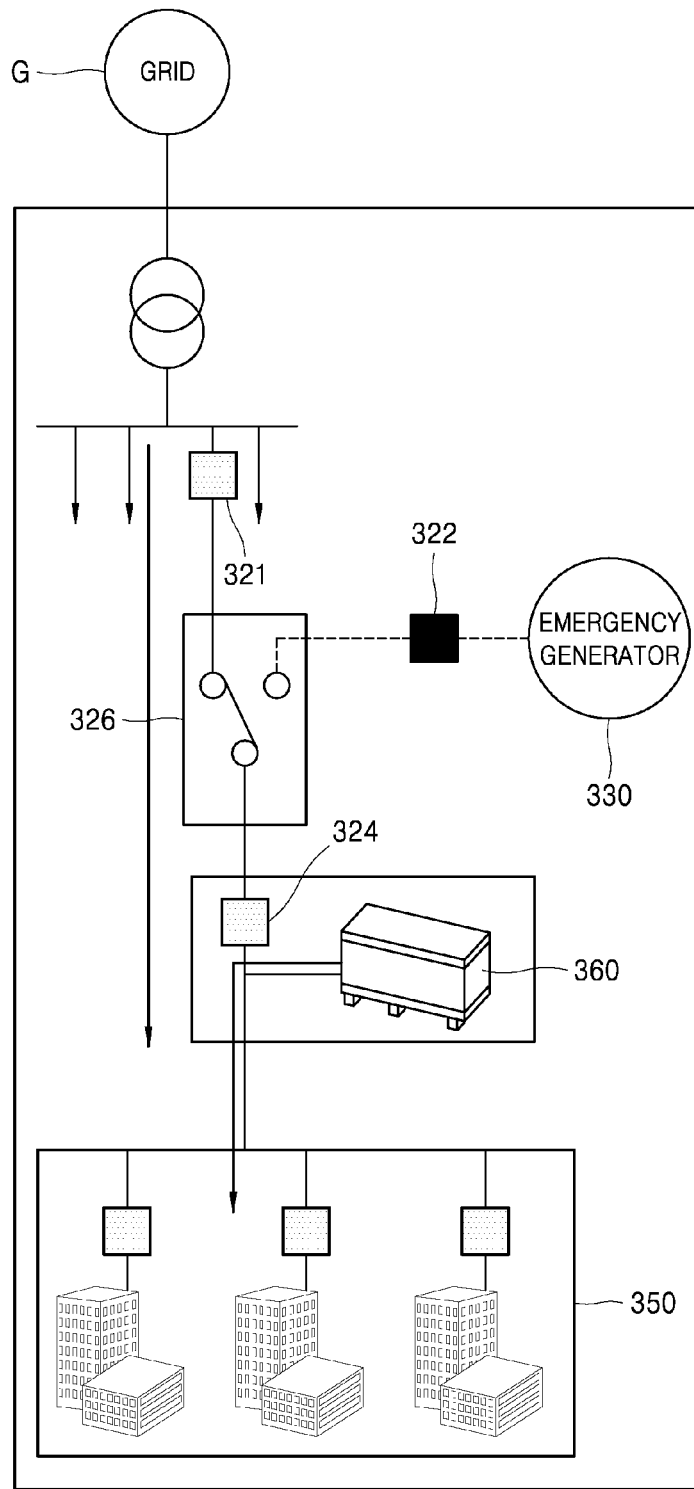
Figure 20:
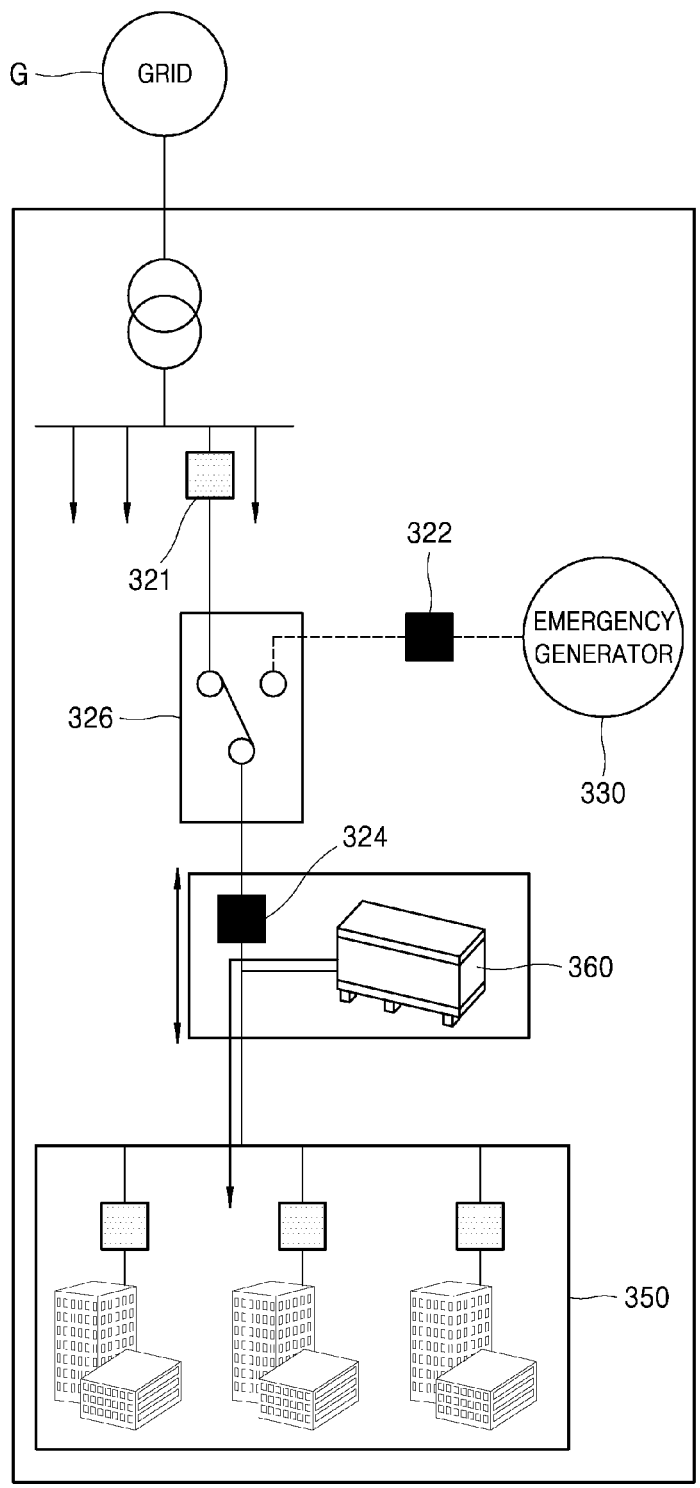
Figure 21:
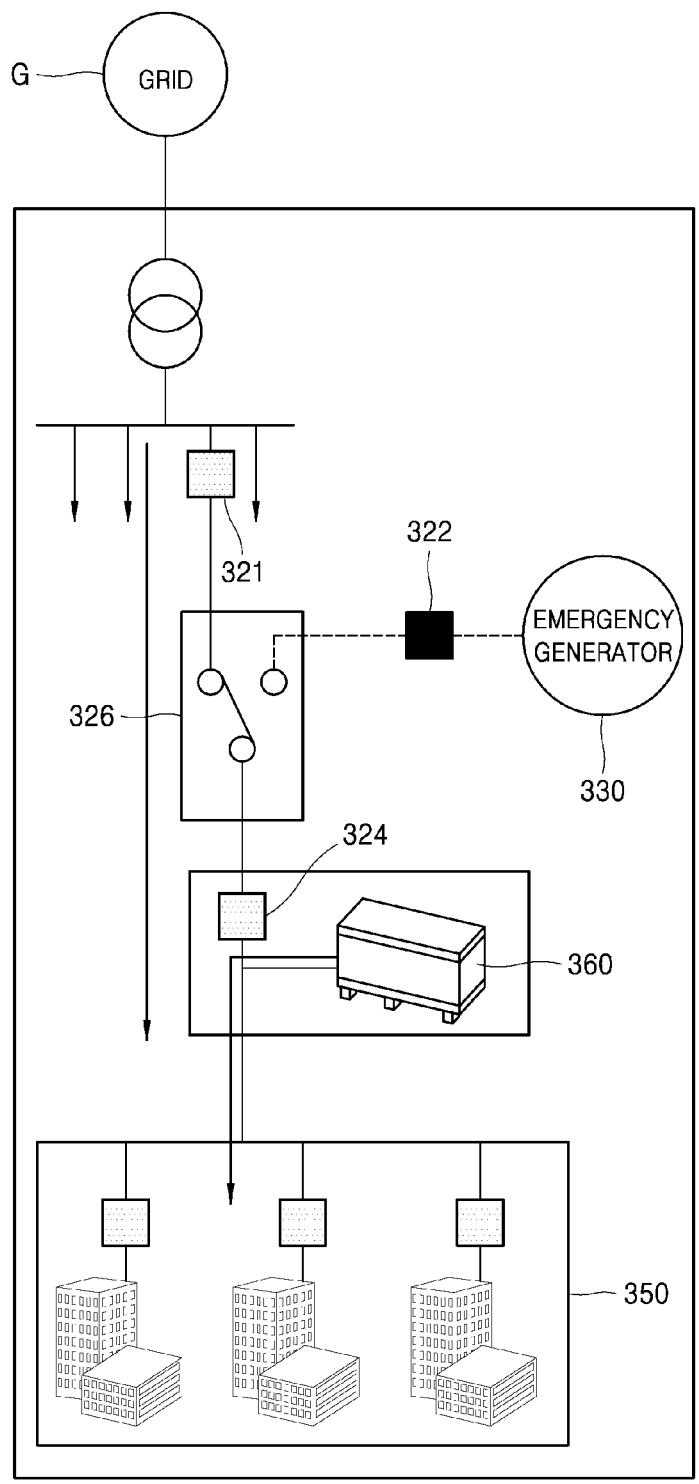

In contrast, referring to FIGS. 3, 18, 20 and 21, the first microgrid cell 300 may be re-associated with the grid G through other processes different from those of FIGS. 18 and 19.

In more detail, during power recovery of the grid G, the circuit breaker 321 mounted to the grid G may be activated.

The first EMS 310 may stop operation of the emergency generator 330, the STS 324 may detect stoppage of the emergency generator 330, may supply a second notification message to the first ESS 360 and may again sever connection to the grid G.

In this case, when the emergency generator 330 stops operation, the circuit breaker 322 mounted to the emergency generator 330 may sever connection to the emergency generator 330.

Upon receiving the second notification message from the STS 324, the first ESS 360 may switch from the constant-power mode to the CVCF mode, such that the first ESS 360 may independently supply power to the first load 350.

In this case, when the first ESS 360 switches to the CVCF mode, the CTTS 326 may sever connection between the emergency generator 330 and the STS 324 and at the same time may connect the STS 324 to the grid G.

When power is supplied from the grid G to the first load 350, the STS 324 may detect the power supplied from the grid G and thus supply a third notification message to the first ESS 360. Upon receiving the third notification message from the STS 324, the first ESS 360 may perform the second synchronization algorithm.

When the first ESS 360 performs the first synchronization algorithm, the STS 342 may again release disconnection to the grid G. Thereafter, when disconnection to the grid G is released again, the first ESS 360 may again switch from the CVCF mode to the constant-power mode.

For reference, the second synchronization algorithm may be an algorithm for synchronizing a frequency, a voltage, and a phase angle of the first ESS 360 with a frequency, a voltage, and a phase angle of the grid G.

Since the STS 324 again releases disconnection to the grid G, the first microgrid cell 300 may be normally recovered to a previous state that has existed prior to power interruption of the grid G.

A method for controlling optimum power generation of the hierarchical power control system shown in FIG. 1 will hereinafter be described with reference to FIG. 22.

Figure 22:
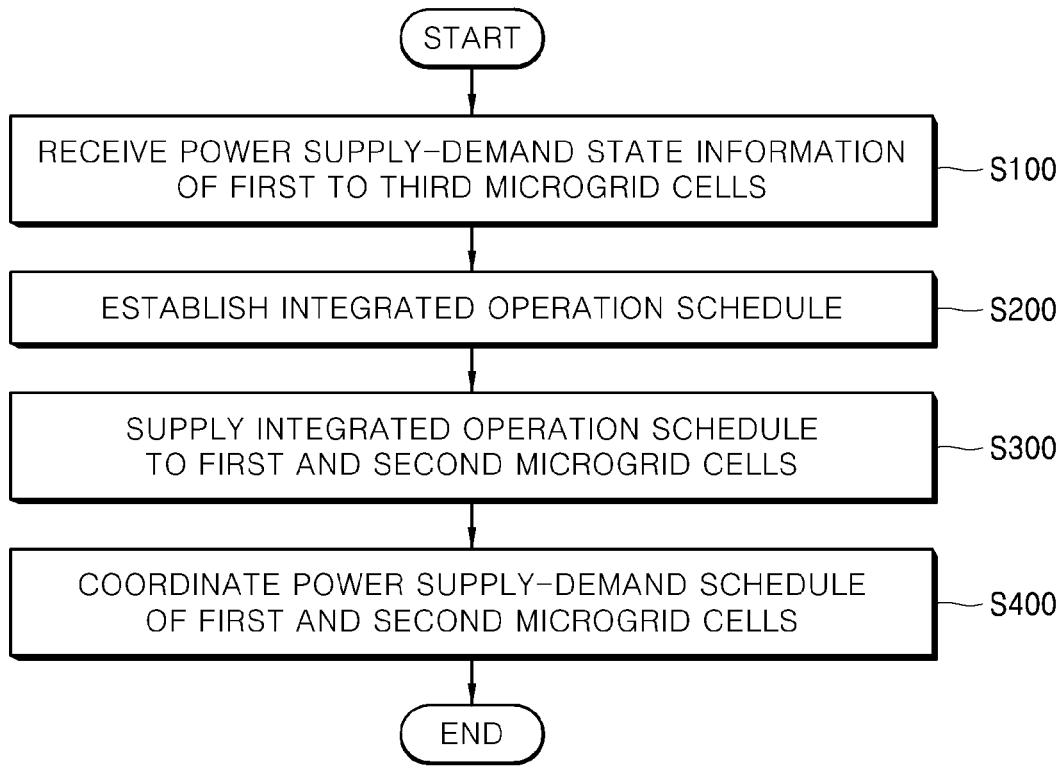
FIG. 22 is a flowchart illustrating a method for controlling optimum power generation of the hierarchical power control system shown in FIG. 1.

FIG. 22 is a flowchart illustrating a method for controlling optimum power generation of the hierarchical power control system shown in FIG. 1.

Referring to FIGS. 1, 3 and 22, the integrated control system 100 may receive power supply-demand state information of the first to third microgrid cells (S100).

In more detail, the integrated control system 100 may receive the power supply-demand state information of the first to third microgrid cells (300, 400, 500) through the middleware server 200.

For example, the power supply-demand state information may include first power supply-demand state information received from the first EMS 310 and second power supply-demand state information received from the second EMS 410.

The first power supply-demand state information may include, for example, at least one of power amount information producible in the first microgrid cell 300, necessary power amount information of the first microgrid cell 300, and operation schedule information of the first ESS 360. The second power supply-demand state information may include, for example, at least one of power amount information producible in the second microgrid cell 400, necessary power amount information of the second microgrid cell 400, and operation schedule information of the second ESS 460.

The power supply-demand state information may further include third power supply-demand state information supplied from the third sensor 520, because the third microgrid cell 500 does not include the distributed power system, the ESS, the EMS, etc. as described above.

In this case, the third power supply-demand state information may include, for example, power amount information needed for the third microgrid cell 500.

Upon receiving the power supply-demand state information of the first to third microgrid cells (S100), the integrated control system 100 may establish the integrated operation schedule (S200).

In more detail, the integrated control system 100 may establish the integrated operation schedule based on the power supply-demand state information of the first to third microgrid cells (300, 400, 500).

When the integrated control system 100 establishes the integrated operation schedule, the integrated control system 100 may perform modeling of the distributed power systems, the loads, and the ESSs present in the respective microgrid cells into a single distributed power system, a single load, and a single ESS.

For example, the integrated control system 100 may perform modeling of the first distributed power system 395 of the first microgrid cell 300 and the second distributed power system of the second microgrid cell 400 into a single distributed power system, and may perform modeling of the first ESS 360 of the first microgrid cell 300 and the second ESS 460 of the second microgrid cell 400 into a single ESS. In addition, the integrated control system 100 may perform modeling of the first to third loads (350, 450, 550) into a single load.

As described above, the integrated control system 100 may perform modeling of the distributed power systems, the loads, and the ESSs present in the respective microgrid cells into a single distributed power system, a single load, and a single ESS, such that the integrated control system 100 may establish the integrated operation schedule from all points of view.

For example, when a target peak control time of the first microgrid cell 300 is in the range from 12:00 to 13:00 o'clock and a target peak control time of the second microgrid cell 400 is in the range from 14:00 to 15:00 o'clock, the integrated control system 100 may synthesize the target peak control times of the respective microgrid cells (300, 400), and may select an optimum target peak control time (e.g., the range of 13:00 to 14:00 o'clock) from all points of view.

However, if the integrated control system 100 does not receive power supply-demand state information of the first to third microgrid cells (300, 400, 500) due to a communication problem between the middleware server 200 and the first to third microgrid cells (300, 400, 500), the integrated control system 100 may estimate the operation schedules of the first to third microgrid cells (300, 400, 500) based on the analysis result received from the middleware server 200.

In this case, the analysis result may be acquired when the cloud server 600 synthesizes power states of the first to third loads (350, 450, 550) received from the first to third sensors (320, 420, 520) and at least one of climate data and power associated data received from the external part and analyzes the synthesized result.

For reference, although the integrated control system 100 establishes the integrated operation schedule based on the power supply-demand state information of the first to third microgrid cells (300, 400, 500), the integrated control system 100 may establish the integrated operation schedule only for the first and second microgrid cells (300, 400) based on only the power supply-demand state information of the first and second microgrid cells (300, 400) according to situations.

Differently from the first and second loads (350, 450) respectively included in the first and second microgrid cells (300, 400), the third load 550 included in the third microgrid cell 500 is a general load unrelated to the distributed power system and aims to provide the analysis-based energy saving service through the third sensor 520, such that the integrated control system 100 can establish the above-mentioned integrated operation schedule.

If the integrated operation schedule is established (S200), the integrated control system 100 may supply the integrated operation schedule to the first and second microgrid cells (300, 400) (S300).

In more detail, the integrated control system 100 may supply the integrated operation schedule to the first EMS 310 and the second EMS 410 through the middleware server 200.

Of course, the integrated control system 100 may supply the integrated operation schedule to the third microgrid cell 500 through the middleware server 200.

However, as described above, the EMS, the ESS, and the distributed power are not present in the third microgrid cell 500, such that the integrated control system 100 may not supply the integrated operation schedule to the third microgrid cell 500.

If the integrated operation schedule is supplied to the first and second microgrid cells (S300), the power supply-demand schedules of the first and second microgrid cells (300, 400) may be coordinated (S400).

In more detail, the first EMS 310 may coordinate the power supply-demand schedule of the first microgrid cell 300 based on the integrated operation schedule received from the middleware server 200. The second EMS 410 may coordinate the power supply-demand schedule of the second microgrid cell 400 based on the integrated operation schedule received from the middleware server 200.

Through the above-mentioned processes, the hierarchical power control system 1 may also perform the optimum power generation control method.

Of course, the integrated operation schedule may also be coordinated through the following processes.

In more detail, the integrated control system 100 may coordinate the integrated operation schedule based on either the analysis result received from the middleware server 200 or realtime power state information of the first to third microgrid cells (300, 400, 500).

Upon receiving power states of the first to third loads (350, 450, 550) from the first to third sensors (320, 420, 520), the cloud server 600 may supply the received power states of the first to third loads (350, 450, 550) to the middleware server 200. Upon receiving power states of the first to third loads (350, 450, 550) from the cloud server 600, the middleware server 200 may supply the received power states of the first to third loads (350, 450, 550) to the integrated control system 100.

Therefore, upon receiving the power states of the first to third loads (350, 450, 550) from the middleware server 200, the integrated control system 100 may compare the received power states of the first to third loads (350, 450, 550) with the integrated operation schedule, and may coordinate the integrated operation schedule based on the result of comparison.

As described above, the present disclosure can synthetically and efficiently control the power supply-demand states of neighbor microgrid cells through the integrated control system 100 that establishes the optimum integrated operation schedule based on the power supply-demand states of the first to third microgrid cells (300, 400, 500).

As is apparent from the above description, the hierarchical power control system according to the embodiments of the present disclosure can efficiently integrated-control power supply-demand states of neighbor microgrid cells through an integrated control system for establishing an optimum integrated operation schedule based on the power supply-demand states of first to third microgrid cells.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A hierarchical power control system associated with a cloud server, comprising:
   a first microgrid cell configured to include a first energy storage system (ESS) having an uninterruptible power supply (UPS) structure and a first load having a power state managed by the first energy storage system (ESS);
   a second microgrid cell configured to include a second load and a second energy storage system (ESS) for managing a power state of the second load;
   a third microgrid cell including a third load;
   a middleware server configured to communicate with the first to third microgrid cells; and
   an integrated control system configured to receive power supply-demand state information of the first to third microgrid cells through the middleware server, and establish an integrated operation schedule based on the received power supply-demand state information of the first to third microgrid cells,
   wherein the first microgrid cell further includes a first sensor for detecting a power state of the first load,
   wherein the second microgrid cell further includes a second sensor for detecting a power state of the second load,
   wherein the third microgrid cell further includes a third sensor for detecting a power state of the third load,
   wherein the first to third sensors respectively detect the power states of the first to third loads, and transmit the detected power states to the cloud server,
   wherein the cloud server supplies the power states of the first to third loads, received from the first to third sensors, to the middleware server,
   wherein the middleware server supplies the power states of the first to third loads, received from the cloud server, to the integrated control system, and
   wherein the integrated control system compares the power states of the first to third loads, received from the middleware server, with the integrated operation schedule, and coordinates the integrated operation schedule based on a result of the comparison.

2. The hierarchical power control system of claim 1, wherein:
   the cloud server receives at least one of climate data and power associated data from an external part, synthetically analyzes not only the power states of the first to third loads, received from the first to third sensors, but also at least one of the climate data and power associated data received from the external part, and supplies the analyzed result to the middleware server.

3. The hierarchical power control system of claim 2, wherein:
   the middleware server supplies the received analyzed result to the integrated control system; and
   the integrated control system estimates respective operation schedules of the first to third microgrid cells based on the analyzed result received from the middleware server.

4. The hierarchical power control system of claim 2, wherein:
   the middleware server supplies the received analyzed result to the integrated control system, and
   the integrated control system estimates an integrated operation schedule of at least two microgrid cells from among the first to third microgrid cells based on the analyzed result received from the middleware server.

5. The hierarchical power control system of claim 1, wherein:
   the first microgrid cell further includes an emergency generator, a building associated power system having a first distributed power system, and a first energy management system (EMS) for controlling the emergency generator, the building associated power system, and the first energy storage system (ESS); and
   the second microgrid cell further includes not only a second distributed power system driven associated with the second energy storage system (ESS), but also a second energy management system (EMS) for controlling the second energy storage system (ESS) and the second distributed power system.

6. The hierarchical power control system of claim 5, wherein the building associated power system further comprises:
   a building energy management system (BEMS);

a panel board configured to communicate with the building energy management system (BEMS);
a building automation system (BAS) configured to communicate with the building energy management system (BEMS);
a cooling/heating system connected to the building automation system (BAS);
the first distributed power system connected to the building automation system (BAS); and
a third energy storage system (ESS) connected to the building automation system (BAS),
wherein the building energy management system (BEMS) reduces a peak load by controlling at least one of the cooling/heating system, the first distributed power system, and the third energy storage system (ESS) through the building automation system (BAS).

7. The hierarchical power control system of claim 5, wherein:
the integrated control system receives the power supply-demand state information through the middleware server,
the power supply-demand state information includes first power supply-demand state information received from the first energy management system (EMS) and second power supply-demand state information received from the second energy management system (EMS),
the first power supply-demand state information includes at least one of power amount information producible in the first microgrid cell, necessary power amount information of the first microgrid cell, and operation schedule information of the first energy storage system (ESS), and
the second power supply-demand state information includes at least one of power amount information producible in the second microgrid cell, necessary power amount information of the second microgrid cell, and operation schedule information of the second energy storage system (ESS).

8. The hierarchical power control system of claim 7, wherein:
the integrated control system supplies the integrated operation schedule to the first and second energy management systems (EMSs) through the middleware server,
the first energy management system (EMS) coordinates a power supply-demand schedule of the first microgrid cell based on the integrated operation schedule received through the middleware server, and
the second energy management system (EMS) coordinates a power supply-demand schedule of the second microgrid cell based on the integrated operation schedule received through the middleware server.

9. A hierarchical power control system associated with a cloud server, comprising:
a first microgrid cell configured to include an emergency generator by which connection to a grid is opened or closed through a closed transition transfer switch (CTTS), a first energy storage system (ESS) driven associated with the emergency generator, and a first load having a power state managed by the first energy storage system (ESS);
a second microgrid cell configured to include a second load and a second energy storage system (ESS) for managing a power state of the second load;
a third microgrid cell including a third load;
a middleware server configured to communicate with the first to third microgrid cells; and
an integrated control system configured to receive power supply-demand state information of the first to third microgrid cells through the middleware server, and establish an integrated operation schedule based on the received power supply-demand state information of the first to third microgrid cells,
wherein the first microgrid cell further includes a first sensor for detecting a power state of the first load,
wherein the second microgrid cell further includes a second sensor for detecting a power state of the second load,
wherein the third microgrid cell further includes a third sensor for detecting a power state of the third load,
wherein the first to third sensors respectively detect the power states of the first to third loads, and transmit the detected power states to the cloud server,
wherein the cloud server supplies the power states of the first to third loads, received from the first to third sensors, to the middleware server,
wherein the middleware server supplies the power states of the first to third loads, received from the cloud server, to the integrated control system, and
wherein the integrated control system compares the power states of the first to third loads, received from the middleware server, with the integrated operation schedule, and coordinates the integrated operation schedule based on a result of the comparison.

10. The hierarchical power control system of claim 9, wherein:
the first microgrid cell further includes not only a building associated power system having a first distributed power system, but also a first energy management system (EMS) for controlling the emergency generator, the building associated power system, and the first energy storage system (ESS); and
the second microgrid cell further includes not only a second distributed power system driven associated with the second energy storage system (ESS), but also a second energy management system (EMS) for controlling the second energy storage system (ESS) and the second distributed power system.

11. The hierarchical power control system of claim 10, wherein:
the integrated control system receives the power supply-demand state information through the middleware server,
the power supply-demand state information includes first power supply-demand state information received from the first energy management system (EMS) and second power supply-demand state information received from the second energy management system (EMS),
the first power supply-demand state information includes at least one of power amount information producible in the first microgrid cell, necessary power amount information of the first microgrid cell, and operation schedule information of the first energy storage system (ESS), and
the second power supply-demand state information includes at least one of power amount information producible in the second microgrid cell, necessary power amount information of the second microgrid cell, and operation schedule information of the second energy storage system (ESS).

12. The hierarchical power control system of claim 11, wherein:

the integrated control system supplies the integrated operation schedule to the first and second energy management systems (EMSs) through the middleware server, the first energy management system (EMS) coordinates a power supply-demand schedule of the first microgrid cell based on the integrated operation schedule received through the middleware server, and the second energy management system (EMS) coordinates a power supply-demand schedule of the second microgrid cell based on the integrated operation schedule received through the middleware server.

13. A hierarchical power control system associated with a cloud server, comprising:
- a first microgrid cell configured to include a first energy storage system (ESS) having an uninterruptible power supply (UPS) structure and a first load having a power state managed by the first energy storage system (ESS);
- a second microgrid cell configured to include a second load and a second energy storage system (ESS) for managing a power state of the second load;
- a third microgrid cell including a third load;
- an integrated control system configured to receive power supply-demand state information of the first to third microgrid cells from the first to third microgrid cells, and establish an integrated operation schedule based on the received power supply-demand state information of the first to third microgrid cells,
   - wherein the first microgrid cell further includes a first sensor for detecting a power state of the first load,
   - wherein the second microgrid cell further includes a second sensor for detecting a power state of the second load,
   - wherein the third microgrid cell further includes a third sensor for detecting a power state of the third load,
   - wherein the first to third sensors respectively detect the power states of the first to third loads, and transmit the detected power states to the cloud server,
   - wherein the cloud server supplies the power states of the first to third loads
   - wherein the integrated control system receives the power states of the first to third loads, and
   - wherein the integrated control system compares the power states of the first to third loads with the integrated operation schedule, and coordinates the integrated operation schedule based on a result of the comparison.

14. The hierarchical power control system of claim 13, wherein:
- the first microgrid cell further includes an emergency generator, a building associated power system having a first distributed power system, and a first energy management system (EMS) for controlling the emergency generator, the building associated power system, and the first energy storage system (ESS); and
- the second microgrid cell further includes not only a second distributed power system driven associated with the second energy storage system (ESS), but also a second energy management system (EMS) for controlling the second energy storage system (ESS) and the second distributed power system.

* * * * *